(12) United States Patent
Kameyama

(10) Patent No.: US 8,035,871 B2
(45) Date of Patent: Oct. 11, 2011

(54) DETERMINING TARGET LUMINANCE VALUE OF AN IMAGE USING PREDICTED NOISE AMOUNT

(75) Inventor: Hirokazu Kameyama, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 245 days.

(21) Appl. No.: 12/362,759

(22) Filed: Jan. 30, 2009

(65) Prior Publication Data

US 2009/0136152 A1    May 28, 2009

Related U.S. Application Data

(62) Division of application No. 11/148,314, filed on Jun. 9, 2005, now Pat. No. 7,508,550.

(30) Foreign Application Priority Data

Jun. 17, 2004 (JP) ................................. 2004-179080
Jun. 17, 2004 (JP) ................................. 2004-179082

(51) Int. Cl.
| | | |
|---|---|---|
| G03F 3/08 | (2006.01) | |
| H04N 1/46 | (2006.01) | |
| H04N 1/40 | (2006.01) | |
| H04N 9/68 | (2006.01) | |
| G06K 9/00 | (2006.01) | |

(52) U.S. Cl. ....... 358/520; 348/234; 358/3.23; 358/500; 382/167

(58) Field of Classification Search ................ 358/3.23, 358/520, 500; 348/234; 382/167
See application file for complete search history.

(56) References Cited

U.S. PATENT DOCUMENTS

| | | | |
|---|---|---|---|
| 5,671,013 A | | 9/1997 | Nakao |
| 6,285,398 B1 * | | 9/2001 | Shinsky et al. ............ 348/223.1 |
| 6,642,930 B1 | | 11/2003 | Matsuura et al. |
| 2003/0108102 A1 * | | 6/2003 | Demos ..................... 375/240.07 |
| 2004/0028289 A1 * | | 2/2004 | Le Meur et al. ............... 382/275 |
| 2005/0110958 A1 * | | 5/2005 | Schwartz et al. ............... 353/85 |
| 2005/0254102 A1 | | 11/2005 | Kagami |
| 2008/0246883 A1 | | 10/2008 | Murashita et al. |

FOREIGN PATENT DOCUMENTS

| | | |
|---|---|---|
| JP | 05-100328 | 4/1993 |
| JP | 08-122944 | 5/1996 |
| JP | 2000-196890 A | 7/2000 |
| JP | 2002-203239 A | 7/2002 |
| JP | 2004-220555 A | 8/2004 |

* cited by examiner

*Primary Examiner* — Benny Tieu
*Assistant Examiner* — Eric A Rust
(74) *Attorney, Agent, or Firm* — Sughrue Mion, PLLC

(57) ABSTRACT

A bright luminance value, a dark luminance value, and an average luminance value relating to a face image portion included in an image represented by fed image data are calculated in calculating circuits. Further, a target bright luminance value and a target dark luminance value are calculated in a calculating circuit on the basis of a target average luminance value and a dynamic range that are inputted from an input device and the calculated bright luminance value, dark luminance value, and average luminance value. Interpolation processing based on a correspondence between the calculated bright luminance value, dark luminance value, and average luminance value relating to the face image portion and the target bright luminance value, the target dark luminance value, and the target average luminance value respectively corresponding thereto is performed in a corrected value calculating circuit, to create a look-up table.

7 Claims, 15 Drawing Sheets

Fig. 12

| -1 | -1 | -1 |
|----|----|----|
| -1 | 8  | -1 |
| -1 | -1 | -1 |

DETERMINING TARGET LUMINANCE VALUE OF AN IMAGE USING PREDICTED NOISE AMOUNT

This is a divisional of application Ser. No. 11/148,314 filed Jun. 9, 2005. The entire disclosure of the prior application, application Ser. No. 11/148,314, is hereby incorporated by reference.

BACKGROUND OF THE INVENTION

1. Field of the Invention

The present invention relates to an image correcting apparatus and method for subjecting digital image data to image correction, and a program for causing a computer to make image correction. Further, the present invention relates to a look-up table creating apparatus and method related to the brightness of an image, and a program for creating a look-up table.

2. Description of the Background Art

Digital image data is subjected to various types of correction processing for the purpose of making an image represented by digital image data easy to see and improving the quality of the image, for example. Concentration correction (luminance correction, brightness correction) which is the one correction processing is for correcting the digital image data such that the image represented by the digital image data becomes brighter when it is dark, while becoming darker when it is bright.

JP-A-2000-196890 describes an image processing apparatus that converts, when the concentration of a subject is not within a target concentration range, the gray scale of an image such that the concentration of the subject will be within the target concentration range in a state where the concentrations of the highest concentration portion and the lowest concentration portion in the image are substantially held. A gray-scale curve for concentration correction is specifically shown in FIGS. 3 and 4.

In the image processing apparatus (concentration correction conforming to the gray-scale curve shown in FIGS. 3 and 4) described in JP-A-2000-196890, the concentration of the subject can be within the target concentration range, so that the concentrations of the highest concentration portion and the lowest concentration portion in the image are not corrected. Since the possibilities that the concentration of a highlight portion in the image is reduced and the concentration of a shadow portion in the image is increased are eliminated, the image can be prevented from having a loose impression.

However, the gray-scale curve not only defines the concentration (brightness, darkness) of the image after correction but also is associated with high contrast (hard gradation) or low contrast (soft gradation) of the image. If the slope of the gray-scale curve is large, a dark portion and a bright portion in the image respectively become darker and brighter, so that the image after correction becomes a sharp image (high contrast, hard gradation). Conversely, when the slope of the gray-scale curve is small, the difference between a dark portion and a bright portion in the image becomes small, so that the image after correction has a blurred impression (low contrast, soft gradation).

The image processing apparatus (concentration correction conforming to the gray-scale curves shown in FIGS. 3 and 4) described in JP-A-2000-196890 does not consider the change in the high contrast or low contrast of the image. When the concentration correction conforms to the gray-scale curve shown in FIG. 3, the image after correction always has low contrast with respect to a dark portion (the input concentration is 0 to 1) in the image, while always having high contrast with respect to a bright portion (the input concentration is 1 to 2) in the image. When the concentration correction conforms to the gray-scale curve shown in FIG. 4, the image after correction always has high contrast with respect to a dark portion (the input concentration is 0 to 1) in the image, while always having low contrast with respect to a bright portion (the input concentration is 1 to 2) in the image.

Furthermore, in a case where color prints are produced from images, for example, represented by digital image data obtained by reading images recorded on photographic negative films or reversal films using a scanner or the like or digital image data acquired by a digital camera, the digital image data may, in some cases, be subjected to brightness correction (luminance correction, concentration correction) such that the brightness (luminance, concentration) of a desired subject image portion such as the face of a character included in a print image becomes suitable brightness (luminance, concentration). In JP-A-2000-196890, the face of a character included in the image is extracted, and the image data is subjected to concentration correction such that the average concentration in a face area will be in a correction target range.

When the image is corrected to higher brightness, however, noise included in the image is liable to be viewed more conspicuously than that before correction. That is, consider a case where the entire image is uniformly subjected to concentration correction (such correction that the image becomes brighter) such that the average concentration in a desired subject image portion such as the face of the character included in the image (the average concentration in the face area) is in the correction target range, as in JP-A-2000-196890. In this case, when the desired subject image portion in the image includes much noise, it becomes brighter by the concentration correction. However, the noise is conspicuous in the image. If a portion other than the desired subject image portion includes noise, the noise is also conspicuous with respect to the portion.

When image data to be processed includes noise, a noise component in the image data can be removed by using a noise removal filter. However, it is difficult to completely remove the noise. When image data having a high resolution (the number of pixels is large when it is displayed) is subjected to noise removal processing, a long processing time period is required, so that the resources of a computer device is occupied for a long time.

SUMMARY OF THE INVENTION

A first object of the present invention is to allow image correction to be made in consideration of both the brightness (darkness) and the high contrast (low contrast) of an image.

A second object of the present invention is to prevent, even if an image portion to be paid attention to in an image includes noise, the noise in the image portion to be paid attention to from being conspicuous after the image is subjected to brightness (concentration, luminance) correction.

A first invention provides an apparatus for and a method of creating a look-up table used for image correction. The brightness (luminance) of image data is corrected on the basis of the look-up table created by the look-up table creating apparatus and method. In the present invention, a luminance value is used as data representing the brightness of the image. The luminance value can be uniquely converted into a concentration value and therefore, can be substituted for the concentration value in the present invention The look-up table created by the look-up table creating apparatus and method according to the present invention is one in which output luminance values (corrected values) corresponding to input luminance values to be inputted are respectively defined in correspondence with the input luminance values. The created look-up table can be expressed as a luminance conversion curve (a concentration conversion curve, a gray-scale curve) on a graph respectively using the input luminance value to enter its horizontal axis and using the output luminance value (corrected value) to enter its vertical axis. The look-up table creating apparatus according to the present invention can be referred to as an apparatus for creating a luminance conversion curve (a concentration conversion curve, a gray-scale curve).

A look-up table creating apparatus according to the present invention is characterized by comprising representative luminance value calculation means for calculating a plurality of representative luminance values spaced apart from one another in a particular image included in an image represented by fed image data; corrected luminance value setting/calculation means for setting or calculating a plurality of corrected luminance values respectively corresponding to the plurality of representative luminance values that are calculated by the representative luminance value calculation means; interpolation means for calculating, on the basis of respective correspondences between the plurality of representative luminance values that are calculated by the representative luminance value calculation means and the plurality of corrected luminance values that are set or calculated by the corrected luminance value setting/calculation means, each of corrected luminance values corresponding to luminance values other than the plurality of representative luminance values by such interpolation that in a case where respective correspondences between the representative luminance values and the luminance values other than the representative luminance values and the corrected luminance values corresponding to the luminance values are expressed by a curve, the curve is smooth; and look-up table creation means for creating a look-up table on the basis of the plurality of corrected luminance values respectively corresponding to the plurality of representative luminance values that are set or calculated by the corrected luminance value setting/calculation means and the corrected luminance values respectively corresponding to the luminance values other than the plurality of representative luminance values that are calculated by the interpolation means.

A look-up table creating method according to the present invention is characterized by comprising the steps of calculating a plurality of representative luminance values spaced apart from one another in a particular image included in an image represented by fed image data; setting or calculating a plurality of corrected luminance values respectively corresponding to the calculated plurality of representative luminance values; calculating, on the basis of respective correspondences between the calculated plurality of representative luminance values and the set or calculated plurality of corrected luminance values, each of corrected luminance values corresponding to luminance values other than the plurality of representative luminance values by such interpolation that in a case where respective correspondences between the representative luminance values and the luminance values other than the representative luminance values and the corrected luminance values corresponding to the luminance values are expressed by a curve, the curve is smooth; and creating a look-up table on the basis of the plurality of corrected luminance values respectively corresponding to the set or calculated plurality of representative luminance values and the corrected luminance values respectively corresponding to the luminance values other than the calculated plurality of representative luminance values.

The present invention also provides a program for causing a computer to carry out the look-up table creating method (causing a computer to function as the look-up table creating apparatus). The program according to the present invention is for causing a computer to perform representative luminance value calculation processing for calculating a plurality of representative luminance values spaced apart from one another in a particular image included in an image represented by fed image data; corrected luminance value setting/calculation processing for setting or calculating a plurality of corrected luminance values respectively corresponding to the calculated plurality of representative luminance values; interpolation processing for calculating, on the basis of respective correspondences between the calculated plurality of representative luminance values and the set or calculated plurality of corrected luminance values, each of corrected luminance values corresponding to luminance values other than the plurality of representative luminance values by such interpolation that in a case where respective correspondences between the representative luminance values and the luminance values other than the representative luminance values and the corrected luminance values corresponding to the luminance values are expressed by a curve, the curve is smooth; and look-up table creation processing for creating a look-up table on the basis of the plurality of corrected luminance values respectively corresponding to the plurality of representative luminance values that are set or calculated by the corrected luminance value setting/calculation processing and the corrected luminance values respectively corresponding to the luminance values other than the plurality of representative luminance values that are calculated by the interpolation processing.

An image represented by fed image data (image data read from a film, image data obtained by a digital camera, image data received through a network, etc.) shall include a particular image. The particular image is a primary subject image portion in an image to be subjected to brightness correction (luminance correction), for example, a face image portion of a character. The particular image is partitioned off (detected) from the image represented by the fed image data on the basis of its shape, its structure, a feature amount for a characteristic element included in the particular image, a color to be included in the particular image, and other information.

A plurality of representative luminance values spaced apart from one another in the particular image are calculated. The plurality of representative luminance values spaced apart from one another are a plurality of luminance values out of luminance values for pixels composing the particular image, and mean that luminance differences respectively exist among the plurality of luminance values. In one embodiment, at least a bright luminance value (high luminance value), a dark luminance value (low luminance value), and an average luminance value are calculated as the plurality of representative luminance values in the particular image. As described later, in the look-up table creating apparatus according to the present invention, on the basis of respective correspondences between the calculated plurality of representative luminance values and the corrected luminance values corresponding to the plurality of representative luminance values, the corrected luminance values corresponding to the luminance values other than the calculated plurality of representative luminance values are calculated by interpolation. In order to improve the precision of interpolation processing, therefore, it is preferable that many representative luminance values (and corrected luminance values corresponding to the representative luminance values) are calculated. However, interpolation processing with relatively high precision can be realized by using respective correspondences between at least the three representative luminance values (e.g., the bright luminance value, the dark luminance value, and the average luminance value, described above) spaced apart from one another (not continuous) and corrected luminance values corresponding to the representative luminance values.

When the bright luminance value, the dark luminance value, and the average luminance value are used as the plurality of representative luminance values in the particular image, the highest luminance value and the lowest luminance value out of the luminance values of the pixels composing the particular image can be respectively taken as the bright luminance value and the dark luminance value. Usable as the average luminance value are an average value, an intermediate value, or a most frequency value out of the luminance values of the pixels composing the particular image.

A histogram based on luminance values in the particular image may be used, to take the luminance value that accounts for a predetermined percentage of the total area from the highest luminance value in the histogram as the bright luminance value in the particular image and take the luminance value that accounts for a predetermined percentage of the total area from the lowest luminance value in the histogram as the dark luminance value in the particular image. In this case, the look-up table creating apparatus further comprises particular image histogram creation means for creating the histogram based on the luminance values for the pixels included in the particular image.

The plurality of corrected luminance values respectively corresponding to the calculated plurality of representative luminance values are set or calculated. The corrected luminance value may be set (set by an operator of the look-up table creating apparatus) with respect to each of the calculated plurality of representative luminance values. Alternatively, the corrected luminance values may be set (inputted) with respect to any one or more of the plurality of corrected luminance values, and the remaining corrected luminance values may be automatically calculated.

For example, the plurality of representative luminance values in the particular image are a bright luminance value, a dark luminance value, and an average luminance value. When the corrected luminance values respectively corresponding to the bright luminance value, the dark luminance value, and the average luminance value (the corrected bright luminance value, the corrected dark luminance value, and the corrected average luminance value) are determined, the corrected bright luminance value, the corrected dark luminance value, and the corrected average luminance value can be determined in the following manner.

In one embodiment, the corrected average luminance value corresponding to the average luminance value and a dynamic range (a first dynamic range) between the corrected bright luminance value that should correspond to the bright luminance value and the corrected dark luminance value that should correspond to the dark luminance value are inputted (set) (input means is further provided). In the corrected luminance value setting/calculation means, the corrected bright luminance value corresponding to the bright luminance value and the corrected dark luminance value corresponding to the dark luminance value are calculated on the basis of the inputted corrected average luminance value and dynamic range (first dynamic range) and the bright luminance value, the dark luminance value, and the average luminance value that are calculated by the representative luminance value calculation means. The set value (input value) is used as the corrected average luminance value corresponding to the average luminance value, and the corrected bright luminance value corresponding to the bright luminance value and the corrected dark luminance value corresponding to the dark luminance value are calculated on the basis of the set (inputted) average luminance value, the dynamic range (first dynamic range) between the corrected bright luminance value which should correspond to the bright luminance value and the corrected dark luminance value which should correspond to the dark luminance value and the bright luminance value, the dark luminance value, and the average luminance value that are calculated by the representative luminance value calculation means.

In another embodiment, the corrected average luminance value corresponding to the average luminance value and a dynamic range (second dynamic range) between the corrected bright luminance value that should correspond to the bright luminance value and the corrected average luminance value are inputted (set) (input means is further provided). In the corrected luminance value setting/calculation means, the corrected bright luminance value corresponding to the bright luminance value and the corrected dark luminance value corresponding to the dark luminance value are calculated on the basis of the inputted corrected average luminance value and dynamic range (second dynamic range) and the bright luminance value, the dark luminance value, and the average luminance value that are calculated by the representative luminance value calculation means. The set value (input value) is used as the corrected average luminance value corresponding to the average luminance value, and the corrected bright luminance value corresponding to the bright luminance value and the corrected dark luminance value corresponding to the dark luminance value are calculated on the basis of the set (inputted) corrected average luminance value, the dynamic range (second dynamic range) between the corrected bright luminance value which should correspond to the bright luminance value and the corrected average luminance value, and the bright luminance value, the dark luminance value, and the average luminance value that are calculated by the representative luminance value calculation means.

In still another embodiment, the corrected average luminance value corresponding to the average luminance value and a dynamic range (a third dynamic range) between the corrected average luminance value and the corrected dark luminance value that should correspond to the dark luminance value are inputted (set) (input means is further provided). In the corrected luminance value setting/calculation mean, the corrected bright luminance value corresponding to the bright luminance value and the corrected dark luminance value corresponding to the dark luminance value are calculated on the basis of the inputted corrected average luminance value and dynamic range (third dynamic range) and the bright luminance value, the dark luminance value, and the average luminance value that are calculated by the representative luminance value calculation means. The set value (input value) is used as the corrected average luminance value corresponding to the average luminance value, the corrected bright luminance value corresponding to the bright luminance value and the corrected dark luminance value corresponding to the dark luminance value are calculated on the basis of the set (inputted) corrected average luminance value, the dynamic range (third dynamic range) between the corrected average luminance value and the corrected dark luminance value that should correspond to the dark luminance value and the bright luminance value, the dark luminance value, and the average luminance value that are calculated by the representative luminance value calculation means.

In any one of the three embodiments, the corrected bright luminance value and the corrected dark luminance value may be calculated such that the ratio of the luminance difference between the bright luminance value and the average luminance value to the luminance difference between the bright luminance value and the dark luminance value is equal to the ratio of the luminance difference between the corrected bright luminance value and the corrected average luminance value to the luminance difference between the corrected bright luminance value and the corrected dark luminance value, and the ratio of the luminance difference between the average luminance value and the dark luminance value to the luminance difference between the bright luminance value and the dark luminance value is equal to the ratio of the luminance difference between the corrected average luminance value and the corrected dark luminance value to the luminance difference between the corrected bright luminance value and the corrected dark luminance value. Since the ratio of the luminance difference between the bright luminance value and the average luminance value to the luminance difference between the average luminance value and the dark luminance value in the particular image is equal to the ratio of the luminance difference between the corrected bright luminance value and the corrected average luminance value to the luminance difference between the corrected average luminance value and the corrected dark luminance value, the brightness of the particular image included in the image represented by the fed image data is emphasized as it is.

As described in the foregoing, the respective correspondences between the plurality of representative luminance values that are calculated by the representative luminance value calculation means and the plurality of corrected luminance values that are set or calculated by the corrected luminance value setting/calculation means are found.

Each of the corrected luminance values corresponding to the luminance values other than the plurality of representative luminance values is calculated by such interpolation that in a case where the respective correspondences between the representative luminance values and the luminance values other than the representative luminance values and the corrected luminance values corresponding to the luminance values are expressed by a curve, the curve is smooth.

For example, assuming that the luminance value is represented by 8-bit data, the luminance value can be represented at 256 levels from 0 to 255. By the interpolation, the corrected luminance values respectively corresponding to the luminance values other than the calculated plurality of representative luminance values out of the luminance values at 256 levels are calculated. It is possible to utilize, for such interpolation processing that in a case where respective correspondences between the representative luminance values and the luminance values other than the representative luminance values and the corrected luminance values corresponding to the luminance values are expressed by a curve, the curve is smooth, a spline interpolation method, a nearest neighbor method, a by-linear method, a by-cubic method, etc.

A look-up table is created on the basis of the plurality of corrected luminance values respectively corresponding to the plurality of representative luminance values that are set or calculated by the corrected luminance value setting/calculation means and the corrected luminance values respectively corresponding to the luminance values other than the plurality of representative luminance values that are calculated by the interpolation means. When the luminance value is represented at 256 levels from 0 to 255, respective correspondences between the luminance values at 256 levels (256 luminance values including the plurality of representative luminance values) and corrected luminance values corresponding thereto are stored in the created look-up table. As described above, the look-up table can be expressed as a luminance conversion curve (a concentration conversion curve or a gray-scale curve) on the graph respectively using the input luminance value to enter its horizontal axis and using the output luminance value (corrected value) to enter its vertical axis. The luminance conversion curve passes through all intersections between the plurality of representative luminance values and the plurality of corrected luminance values corresponding thereto and is drawn as a smooth curve.

According to the present invention, the created look-up table stores the plurality of representative luminance values spaced apart from one another in the particular image included in the image represented by the fed image data and the desired corrected luminance values respectively corresponding to the plurality of representative luminance values. Further, the corrected luminance values corresponding to the luminance values other than the representative luminance values are calculated by such interpolation processing that in a case where respective correspondences between the representative luminance values and the luminance values other than the representative luminance values and the corrected luminance values corresponding thereto are expressed by a curve, the curve is smooth. By using the created look-up table (luminance conversion curve), therefore, at least the brightness (luminance value) for the particular image can be corrected (converted) to the desired luminance value, and the high contrast (or low contrast) of the particular image represented by the image data after luminance correction can be changed to one meeting the high contrast (or low contrast) of the particular image represented by the fed image data.

The high contrast (or the low contrast) of the image including the particular image after luminance correction conforms to the slope of the luminance conversion curve in a case where the created look-up table is represented by the luminance conversion curve. When the slope of the luminance conversion curve is large, a dark portion and a bright portion in the image respectively become darker and brighter. Accordingly, the image after correction becomes a sharp image (high contrast, hard gradation). Conversely, when the slope of the luminance conversion curve is small, the difference between the dark portion and the bright portion in the image is decreased, so that the image becomes an image having a blurred impression (low contrast, soft gradation). The high contrast (low contrast) in the particular image after luminance correction (the slope of the luminance conversion curve in the luminance range corresponding to the particular image) can be changed by the above-mentioned dynamic ranges (first to third dynamic ranges). That is, when a large range is set as each of the first to third dynamic ranges, the luminance difference between the corrected bright luminance value and the corrected dark luminance value is increased, and the slope of the luminance conversion curve in the luminance range corresponding to the particular image is increased, so that the particular image after luminance correction has high contrast. Conversely, when a small range is set as each of the first to third dynamic ranges, the luminance difference between the corrected bright luminance value and the corrected dark luminance value is decreased, and the slope of the luminance conversion curve in the luminance range corresponding to the particular image is decreased, so that the particular image after luminance correction has low contrast. By setting the dynamic ranges (first to third dynamic ranges), the particular image after correction having high contrast (or low contrast)

meeting a user's taste can be obtained. The dynamic range is inputted, and the corrected value of the average luminance value (corrected average luminance value) is also inputted. Accordingly, the particular image after correction has high contrast (or low contrast) meeting the user's taste and has brightness (luminance value) meeting the user's taste.

In the preferred embodiment, the interpolation means uses the lowest luminance value as it is as the corrected lowest luminance value corresponding to the lowest luminance value ("0" in the case of eight bits) that can be taken as a luminance value and uses the highest luminance value as it is as the corrected highest luminance value corresponding to the highest luminance value ("255" in the case of eight bits) that can be taken as a luminance value, and respectively calculates the respective corrected luminance values corresponding to luminance values other than the lowest luminance value, the dark luminance value, the average luminance value, the bright luminance value, and the highest luminance value on the basis of five correspondences of the corrected lowest luminance value corresponding to the lowest luminance value, the corrected dark luminance value corresponding to the dark luminance value, the corrected average luminance value corresponding to the average luminance value, the corrected bright luminance value corresponding to the bright luminance value, and the corrected highest luminance value corresponding to the highest luminance value. When the luminance of the entire image represented by the fed image data is corrected, the high contrast (or the low contrast) of the entire image after luminance conversion can be changed to one meeting the high contrast (or the low contrast) of the image represented by the fed image data.

There may be further provided entire image histogram creation means for creating a histogram based on luminance values for pixels included in the image represented by fed image data. The interpolation means may use the histogram created by the entire image histogram creation means, to calculate the luminance value that accounts for a predetermined percentage of the total area from the lowest luminance value in the histogram as the lowest luminance value in the entire image, while calculating the luminance value that accounts for a predetermined percentage of the total area from the highest luminance value in the histogram as the highest luminance value in the entire image, make the lowest luminance value ("0" in the case of eight bits) that can be taken as a luminance value correspond as the corrected lowest luminance value corresponding to the calculated lowest luminance value in the entire image and make the highest luminance value ("255" in the case of eight bits) that can be taken as a luminance value correspond as the corrected highest luminance value corresponding to the calculated highest luminance value in the entire image, and calculate the respective corrected luminance values corresponding to the luminance values other than the lowest luminance value, the dark luminance value, the average luminance value, the bright luminance value, and the highest luminance value from the lowest luminance value in the entire image to the highest luminance value in the entire image on the basis of five correspondences of the corrected lowest luminance value corresponding to the lowest luminance value in the entire image, the corrected dark luminance value corresponding to the dark luminance value, the corrected average luminance value corresponding to the average luminance value, the corrected bright luminance value corresponding to the bright luminance value, and the highest luminance value in the entire image.

Of course, the histogram may be used, to calculate either one of the lowest luminance value and the highest luminance value in the entire image and to make the lowest luminance value or the highest luminance value that can be taken as a luminance value correspond as a corrected luminance value corresponding to the calculated lowest luminance value or highest luminance value in the entire image. With respect to the highest luminance value or the lowest luminance value that is not calculated, the highest luminance value or the lowest luminance value that can be taken as a luminance value is made to correspond as a corrected highest luminance value or a corrected lowest luminance value.

A second invention provides an apparatus for and a method of correcting the brightness (luminance) of image data that is at least a part of fed image data. In the present invention, a luminance value is used as data representing the brightness of an image. Since the luminance value can be uniquely converted into a concentration value, the luminance value can be substituted for a concentration value in the present invention An image correcting apparatus according to the present invention is characterized by comprising representative luminance value calculation means for calculating a representative luminance value in a particular image included in an image represented by fed image data; noise amount calculation means for calculating a noise amount included in particular image data representing the particular image; target luminance value determination means for determining a target luminance value depending on the noise amount calculated by the noise amount calculation means; means for producing data representing a luminance conversion straight line or a luminance conversion curve such that the represented luminance value calculated by the representative luminance value calculation means is corrected to the target luminance value determined by the target luminance value determination means; and luminance correction means for correcting the luminance of at least the particular image data representing the particular image on the basis of the produced data representing the luminance conversion straight line and the luminance conversion curve.

A image correcting method according to the present invention is characterized by comprising the steps of calculating a representative luminance value in a particular image included in an image represented by fed image data; calculating a noise amount included in particular image data representing the particular image; determining a target luminance value depending on the calculated noise amount; producing data representing a luminance conversion straight line or a luminance conversion curve such that the calculated representative luminance value is corrected to the determined target luminance value; and correcting the luminance of at least the particular image data representing the particular image on the basis of the produced data representing the luminance conversion straight line or the luminance conversion curve.

Examples of digital image data to be fed include digital image data obtained by reading an image read on a photographic negative film or a reversal film using a scanner or the like, and digital image data acquired by a digital camera, a camera phone, a PDA (Personal Digital Assistant) with a camera, etc. The digital image data obtained by the scanner, the digital camera, the camera phone, the PDA with a camera, or the like is fed to the image correcting apparatus.

A particular image means an image portion (an image area) having a particular structure, shape, color, etc. that is included in an image represented by fed image data. The particular image includes not only a partial image area included in an image represented by fed image data but also the entire image represented by the fed image data. Examples of the particular image include images representing the face, body, hands, legs, etc. of a character, the face of an animal (cat, dog, monkey, chicken, flog, snake, etc.), a flower petal or a leaf in a plant (cherry, rose, Japanese plum, etc.), a main object (Mount Fuji, moon, temple, etc.) in a background, and a structure (an automobile, etc.). The particular image has a particular structure, shape, color, etc. Accordingly, it is possible to detect (partition, extract) image data representing a particular image (particular image data) from fed image data (image data representing the entire image).

The representative luminance value in the particular image is a value representing the luminance value in the particular image. In one embodiment, an average of the respective luminance values of a plurality of pixels composing the particular image can be used as a representative luminance value. Of course, an intermediate value or a most frequent value may be used as a representative luminance value.

To digital image data, noise generated by the effect of an electronic component mounted inside a camera, noise generated when an image recorded on a photographic negative film or a reversal film is read by a scanner or the like, noise captured by a lens, noise generated by image processing, etc. may, in some cases, be added. The amount of the noise included in the particular image data is calculated by the noise amount calculation means.

A target luminance value is determined depending on the noise amount included in the calculated particular image data. That is, the determined target luminance value varies depending on the noise amount included in the particular image data.

Data representing a luminance conversion straight line or a luminance conversion curve is produced such that the calculated representative luminance value is corrected to the determined target luminance value, and the luminance of at least the particular image data representing the particular image is corrected on the basis of the produced data representing the luminance conversion straight line or the luminance conversion curve.

The data representing the luminance conversion straight line or the luminance conversion curve is produced such that the representative luminance value is corrected to a target luminance value. That is, a pixel having the representative luminance value obtained from the particular image data included in the image data before luminance correction is corrected so as to have the target luminance value by luminance correction processing based on the produced data representing the luminance conversion straight line or the luminance conversion curve.

The luminance of a pixel having a luminance value other than the representative luminance value is corrected on the basis of the produced data representing the luminance conversion straight line or the luminance conversion curve. The luminance conversion straight line or the luminance conversion curve is produced on the basis of a correspondence between the representative luminance value and the target luminance value. For example, in a graph representing an input/output relationship between the input luminance value and the output luminance value, it is possible to produce a luminance conversion straight line passing through an intersection between the representative luminance value (that is an input luminance value) and the target luminance value (that is an output luminance value) and an origin (a point at which an output luminance value corresponding to an input luminance value "0" is "0"). It is possible to also produce a luminance conversion curve passing through three points, i.e., an intersection between the representative luminance value and the target luminance value, an origin, and a corresponding point of the maximum luminance values (e.g., a point at which an output luminance value corresponding to an input luminance value "255" is "255"). In either case, the produced data representing the luminance conversion straight line or the luminance conversion curve defines not only a correspondence between the representative luminance value and the target luminance value but also a correspondence between the other input luminance value and the other output luminance value.

According to the present invention, a target luminance value is determined depending on a noise amount in a particular image included in an image represented by fed image data (included in particular image data), and the determined target luminance value is taken as a corrected value of a representative luminance value. The representative luminance value (corrected value) is calculated depending on the noise amount, thereby realizing correction of a luminance value (concentration, brightness) conforming to the noise amount. The luminance value is corrected after considering the noise amount, thereby making it possible to correct the luminance value (concentration, brightness) of the particular image in such a manner that noise in an image after correction (particularly, a particular image) is not conspicuous.

In one embodiment, the image correcting apparatus further comprises desired target luminance value input means for accepting input of a desired target luminance value, and predicted noise amount calculation means for calculating a predicted noise amount that may be included in the particular image data after luminance correction on the basis of the representative luminance value calculated by the representative luminance value calculation means, the desired target luminance value inputted by the target luminance value input means, and the noise amount calculated by the noise amount calculation means. The target luminance value determination means determines the target luminance value depending on the predicted noise amount calculated by the predicted noise amount calculation means.

In place of the noise amount in the particular image included in the image represented by the fed image data, a noise amount in the particular image in a case where it is assumed that luminance correction has been made (a predicted noise amount) is used for determining the target luminance value. The noise in the particular image can be prevented from being conspicuous after luminance correction by determining the target luminance value using the predicted noise amount and producing data representing a luminance conversion straight line or a luminance conversion curve on the basis of the target luminance value using the determined predicted noise amount.

Preferably, the target luminance value determination means determines, on the basis of an allowable noise amount for noise that may be included in the particular image data after luminance correction and the calculated noise amount or predicted noise amount, that are previously set or inputted, the target luminance value such that the noise amount or the predicted noise amount becomes not more than the allowable noise amount. The allowable noise amount can be set or inputted, and the target luminance value is determined depending on the allowable noise amount, so that luminance correction conforming to allowance of a user to noise is made.

In one embodiment, the target luminance value determination means determines the desired target luminance value inputted from the desired target luminance value input means as a target luminance value when the calculated predicted noise amount is not more than the allowable noise amount, and calculates, when the calculated predicted noise amount exceeds the allowable noise amount, such a new target luminance value that the predicted noise amount takes the same value as the allowable noise amount on the basis of the representative luminance value, the allowable noise amount, and the noise amount, and determines the calculated new target luminance value as the target luminance value. When the calculated predicted noise amount is not more than the allowable noise amount, luminance correction meeting a user's desire is realized. Further, the particular image after luminance correction includes noise whose amount is always not more than the allowable noise amount, so that a user's request for the noise is reliably satisfied. Further, when the predicted noise amount exceeds the allowable noise amount, such a new target luminance value that the predicted noise amount is the same as the allowable noise amount is calculated on the basis of the representative luminance value, the allowable noise amount, and the noise amount, thereby making it possible to calculate such a target luminance value that the representative luminance value is not varied as much as possible while reliably satisfying the user's request for the noise.

The present invention also provides a program for causing a computer to perform image correction processing (a program for causing a computer to function as an image correcting apparatus).

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 12 shows an example of a filter used for noise calculation processing;

DESCRIPTION OF THE PREFERRED EMBODIMENTS

First Embodiment

Figure 1:
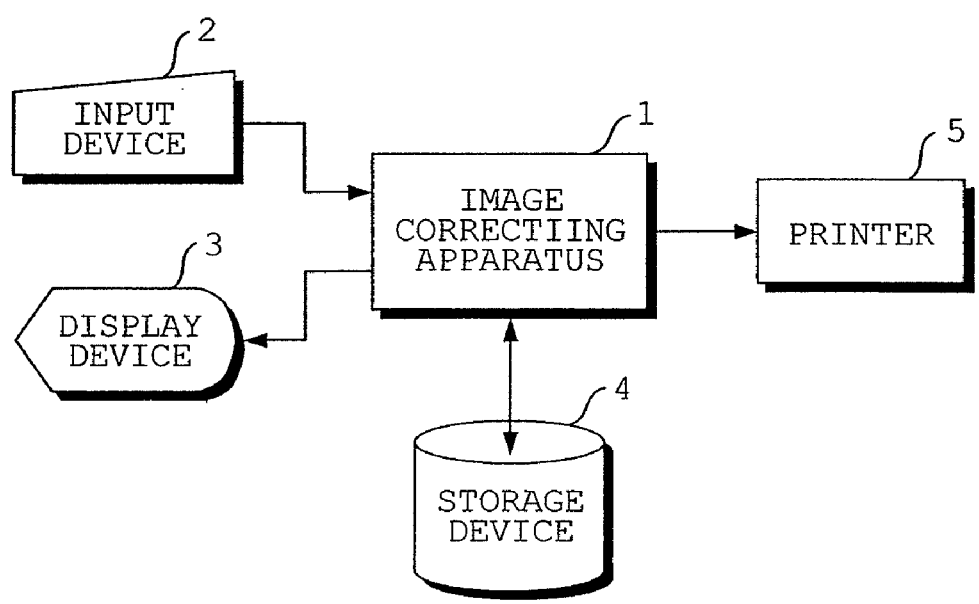
FIG. 1 is a block diagram showing the entire configuration of a digital printing system according to a first embodiment.
Figure 2:
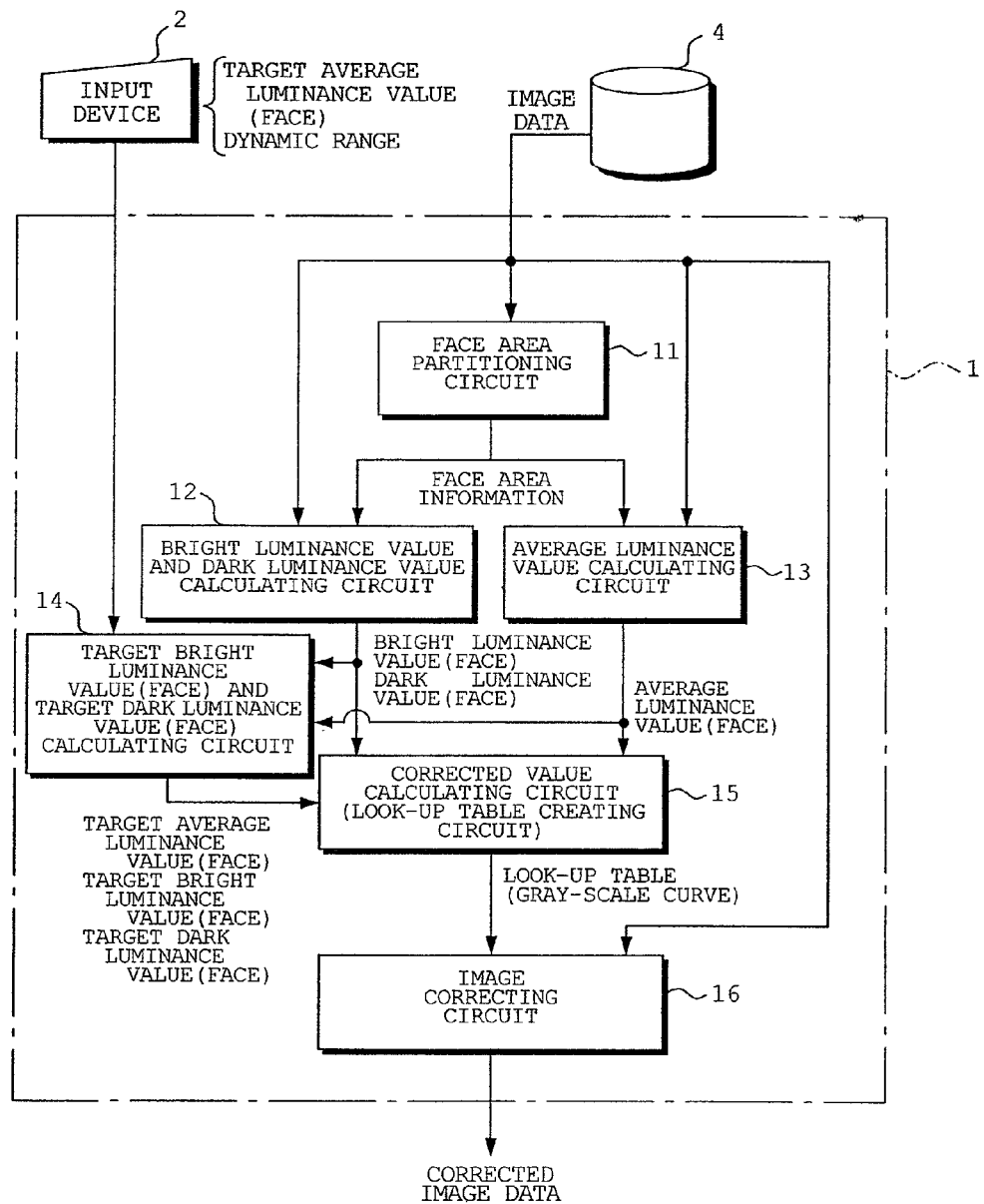
FIG. 2 is a block diagram showing the detailed electrical configuration of an image correcting apparatus in the first embodiment, together with the flow of data.

FIG. 1 is a block diagram showing the entire configuration of a digital printing system. The digital printing system comprises an image correcting apparatus 1, and peripheral equipment (an input device 2, a display device 3, a storage device 4, and a printer 5) connected to the image correcting apparatus 1. FIG. 2 is a block diagram showing the detailed electrical configuration of the image correcting apparatus 1 that is a core apparatus in the digital printing system, together with the flow of data. In FIG. 2, the illustration of the display device 3 and the printer 5 in the peripheral equipment shown in FIG. 1 is omitted.

The image correcting apparatus 1 is an apparatus for correcting brightness (luminance value) (any one of 256 luminance values from 0 to 255) for each pixel in a portion representing the face of a character included in an image represented by fed image data (hereinafter referred to as a face image portion) to more preferable brightness (luminance value) (any one of 256 luminance values from 0 to 255) as well as suitably controlling the high contrast (hard gradation) and low contrast (soft gradation) of the entire image. An input device 2 (a keyboard, a mouse, etc.) connected to the image correcting apparatus 1 is used for input of a plurality of parameters (described later), for example, for image correction processing. On a display screen of the display device 3, a screen for setting the parameters inputted from the input device 2, images represented by image data before and after correction, and so forth are displayed. The storage device (a hard disk, a memory card, a CD-ROM, etc.) 4 stores image data. The image data read out of the storage device 4 is subjected to image correction processing in the image correcting apparatus 1. The printer 5 prints the image represented by the image data after correction on printing paper or the like.

The image correcting apparatus 1 comprises a face area partitioning circuit 11, a bright luminance value and dark luminance value calculating circuit 12, an average luminance value calculating circuit 13, a target bright luminance value and target dark luminance value calculating circuit 14, a corrected value calculating circuit (look-up table creating circuit) 15, and an image correcting circuit 16.

The image data read out of the storage device 4 connected to the image correcting apparatus 1 is subjected to image correction in the image correcting circuit 16. The image correction processing performed in the image correcting circuit 16 conforms to a corrected value table (look-up table), which defines a correspondence between an input luminance value and an output luminance value (corrected value), calculated (created) in the corrected value calculating circuit (look-up table creating circuit) 15. The look-up table can be expressed as a luminance conversion curve (gray-scale curve).

A bright luminance value relating to the face image portion, a dark luminance value relating to the face image portion, an average luminance value relating to the face image portion, a target average luminance value (corrected average luminance value) relating to the face image portion, a target bright luminance value (corrected bright luminance value) relating to the face image portion, and a target dark luminance value (corrected dark luminance value) relating to the face image portion (the six luminance values will be described in detail later) are given to the corrected value calculating circuit (look-up table creating circuit) 15. The corrected value calculating circuit (look-up table creating circuit) 15 calculates (creates) the corrected value table (look-up table) on the basis of the values.

First, description is made of calculation processing (acquisition processing) of the bright luminance value relating to the face image portion, the dark luminance value relating to the face image portion, and the average luminance value relating to the face image portion. The face area partitioning circuit 11, the bright luminance value and dark luminance value calculating circuit 12, and the average luminance value calculating circuit 13 are used for calculating the three luminance values.

An image represented by image data to be subjected to correction processing shall include an image portion representing the face of a character (a face image portion). The image data representing the image including the face image portion is read out of the storage device 4.

The image data read out of the storage device 4 is inputted to each of the face area partitioning circuit 11, the bright luminance value and dark luminance value calculating circuit 12, and the average luminance value calculating circuit 13.

The face area partitioning circuit 11 is a circuit for partitioning off the face image portion included in the image (hereinafter referred to as input image) represented by the inputted image data (hereinafter referred to as input image data) from the other image portion (for detecting the face image portion or defining a boundary).

Various types of conventional or new partitioning (detecting) methods can be used for processing for partitioning off a face image portion included in an image. For example, a method of decomposing an image into a plurality of areas and partitioning off (detecting) a face image portion utilizing a two-dimensional histogram relating to hue and saturation obtained for each of the areas obtained by the decomposition (JP-A-5-100328), a method of partitioning off (detecting) a face image portion from the other image portion by pattern matching (JP-A-8-122944), and a method of partitioning off (detecting) a face image portion by detecting a skin candidate area in an image and detecting main face features (eyes, eyebrows, hair, nose, and mouth) in the detected skin candidate area to partition off (detect) the face image portion (JP-A-2002-203239), and a method of setting a leaning frame in an image, leaning image data representing an image portion defined by the leaning frame, to extract one or a plurality of representative feature vectors representing the leaning frame, setting a search frame within the same image, and extracting a face image portion from the search frame on the basis of the degrees of similarity between each of the representative feature vectors and a plurality of feature vectors extracted from the image data representing the image portion defined by the search frame (JP-A-2004-220555).

Figure 3A:
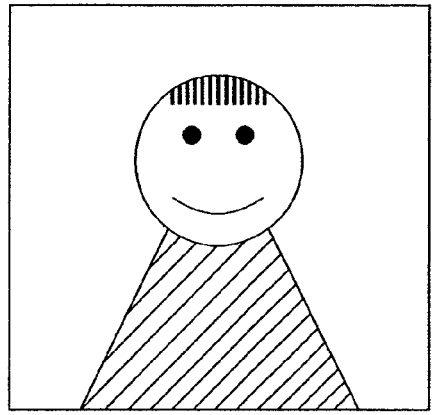
FIG. 3(A) illustrates an example of an image represented by input image data.
Figure 3B:
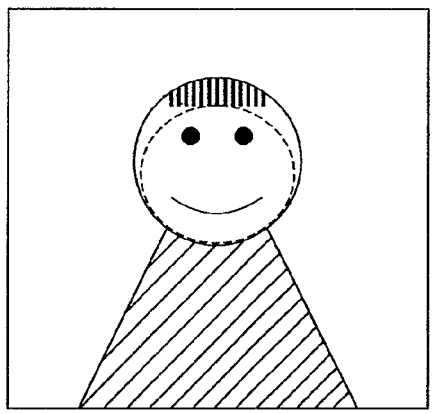
FIG. 3(B) shows how a face image portion is partitioned off (detected)
Figure 3C:
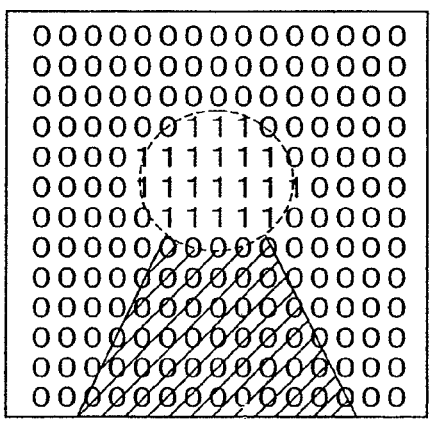
FIG. 3(C) shows a mask image.

The face area partitioning circuit 11 outputs binary data (data to which 1 or 0 corresponds for each pixel address) taking each of pixels included in the partitioned (detected) face image portion (within a face image area) as one (or zero) and taking each of pixels included in the image portion other than the face image portion (outside the face image area) as zero (or one). FIGS. 3(A), 3(B), and 3(C) schematically show an image represented by input image data, how a face image portion is partitioned off (detected) by the face area partitioning circuit 11, and binary data (mask data) outputted from the face area partitioning circuit 11 taking each of pixels included in the face image portion as one and taking each of pixels included in the image portion other than the face image portion as zero, respectively.

The binary data outputted from the face area partitioning circuit 11 defines a position and a range (an area position) of the face image portion included in the input image. The binary data outputted from the face area partitioning circuit 11 is referred to as face area information.

The face area information outputted from the face area partitioning circuit 11 is inputted to each of the bright luminance value and dark luminance value calculating circuit 12 and the average luminance value calculating circuit 13.

The bright luminance value and dark luminance value calculating circuit 12 calculates, out of luminance values for pixels composing the face image portion included in the input image, the largest luminance value and the smallest luminance value. As described above, the input image data representing the input image is fed to the bright luminance value and dark luminance value calculating circuit 12 from the storage device 4. The area position of the face image portion included in the input image is specified by the face area information outputted from the face area partitioning circuit 11.

Figure 4:
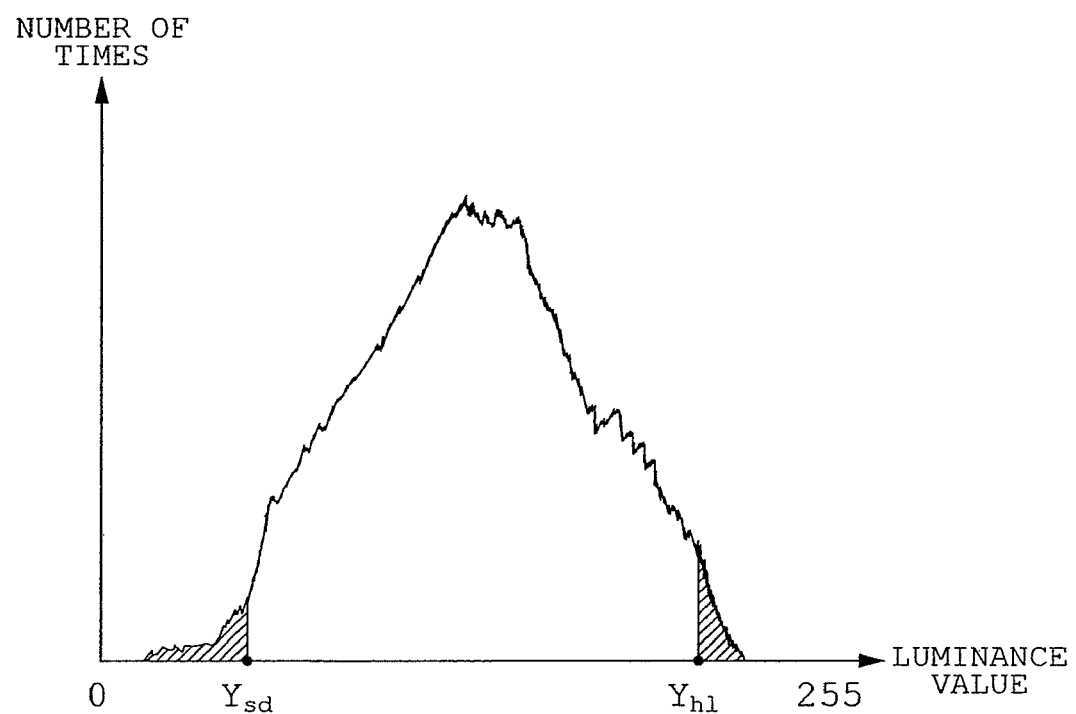
FIG. 4 shows a histogram based on luminance values in a face image portion.

Although the largest luminance value and the smallest luminance value but of the luminance values for the pixels composing the face image portion can be simply employed as a bright luminance value ($Yhl$) and a dark luminance value ($Ysd$), a singular (inaccurate) luminance value may, in some cases, exist due to the effect of noise or the like depending on the input image. In order to prevent the singular (inaccurate) luminance value from being determined as a bright luminance value or a dark luminance value, a histogram is created using the luminance values for the pixels composing the face image portion in the bright luminance value and dark luminance value calculating circuit 12. In the histogram, a luminance value that accounts for 1% of the total area from the largest luminance value is calculated as the bright luminance value ($Yhl$), and a luminance value that accounts for 1% of the total area from the smallest luminance value is calculated as the dark luminance value ($Ysd$) (see FIG. 4). Even if the pixel having the singular (inaccurate) luminance value exists, the luminance value can be prevented from being determined as a bright luminance value or a dark luminance value.

The average luminance value calculating circuit 13 calculates an average of the luminance values for the pixels composing the face image portion included in the input image. The calculated average value is an average luminance value ($Yave$). The average luminance value ($Tave$) is calculated by the following equation 1:

$$(\Sigma Yi)/n \qquad \text{equation 1}$$

Here, $Yi$ and $n$ respectively indicate the luminance value for each of the pixels composing the face image portion and the number of pixels composing the face image portion.

In place of the average value, an intermediate value or a most frequent value may be used as the average luminance value ($Yave$).

The bright luminance value ($Yhl$) and the dark luminance value ($Ysd$) that are calculated in the bright luminance value and dark luminance value calculating circuit 12 and the average luminance value ($Yave$) calculated in the average luminance value calculating circuit 13 are respectively inputted to the corrected value calculating circuit (look-up table creating circuit) 15 and the target bright luminance value and target dark luminance value calculating circuit 14.

A target average luminance value, a target bright luminance value, and a target dark luminance value relating to the face image portion, together with the bright luminance value ($Yhl$), the dark luminance value ($Ysd$), and the average luminance value ($Yave$) relating to the face image portion obtained in the above-mentioned manner, are also given to the corrected value calculating circuit (look-up table creating circuit) 15. A value inputted by an operator from the input device 2 is used as the target average luminance value. The target bright luminance value and the target dark luminance value are calculated in the target bright luminance value and target dark luminance value calculating circuit 14.

A target average luminance value (Ytarget) is inputted to the input device 2 by the operator of the image correcting apparatus 1. The target average luminance value (Ytarget) becomes a corrected value of the average luminance value (Yave) obtained from the face image portion (the target average luminance value (Ytarget) is stored as a value corresponding to the average luminance value (Yave) in the look-up table). A target bright luminance value (Ytarget_hl) and a target dark luminance value (Ytarget_sd), described below, respectively become corrected values of the bright luminance value (Yhl) and the dark luminance value (Ysd) that are obtained from the face image portion.

Figure 5:
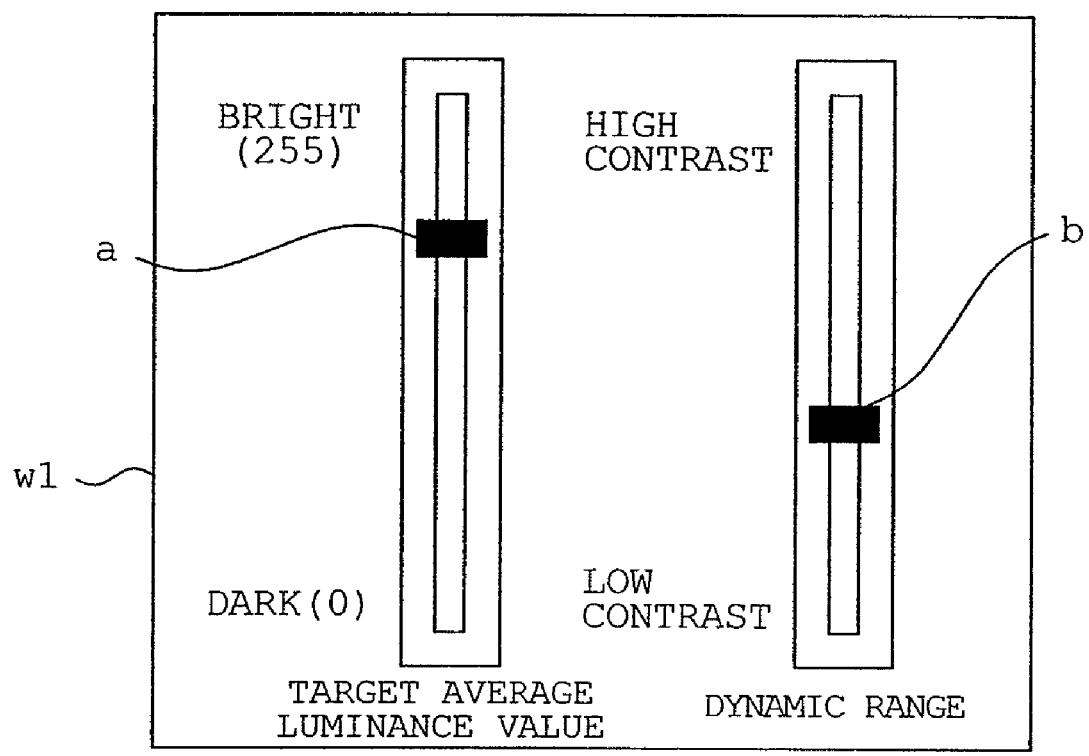
FIG. 5 shows an example of a screen for setting a target average luminance value relating to a face image portion, and a dynamic range (DL) between a target bright luminance value and a target dark luminance value.

A dynamic range (DL) between the target bright luminance value and the target dark luminance value, together with the target average luminance value (Ytarget), is also inputted from the input device 2. The target average luminance value (Ytarget) and the dynamic range (DL) between the target bright luminance value and the target dark luminance value are fed to the target bright luminance value and target dark luminance value calculating circuit 14. FIG. 5 illustrates an example of a screen for setting the target average luminance value (Ytarget) and the dynamic range (DL) between the target bright luminance value and the target dark luminance value, which is displayed on the display screen of the display device 3. A slide bar a is operated by a mouse, to set the target average luminance value (Ytarget). A slide bar b is operated by the mouse, to set the dynamic range (DL) between the target bright luminance value and the target dark luminance value.

As described above, the bright luminance value (Yhl) and the dark luminance value (Ysd) that are calculated in the bright luminance value and dark luminance value calculating circuit 12 and the average luminance value (Yave) calculated in the average luminance value calculating circuit 13 are also fed to the target bright luminance value and target dark luminance value calculating circuit 14. As described below, the target bright luminance value and target dark luminance value calculating circuit 14 utilizes the target average luminance value (Ytarget) and the dynamic range (DL) between the target bright luminance value and the target dark luminance value that are inputted from the input device 2, the bright luminance value (Yhl) and the dark luminance value (Ysd) that are calculated in the bright luminance value and dark luminance value calculating circuit 12, and the average luminance value (Yave) calculated in the average luminance value calculating circuit 13, to calculate the target bright luminance value (Ytarget_hl) and the target dark luminance value (Ytarget_hl).

The target bright luminance value (Ytarget_hl) is calculated by the following equation 2:

$$Ytarget\_hl = Yave + DLhl \quad \text{equation 2}$$

Ytarget_hl: Target bright luminance value
Yave: Average luminance value
DLhl: Dynamic range between target bright luminance value and target average luminance value The target dark luminance (Ytarget_sd) is calculated by the following equation 3:

$$Ytarget\_sd = Yave - DLsd \quad \text{equation 3}$$

Ytarget_sd: Target dark luminance value
DLsd: Dynamic range between target average luminance value and target dark luminance value Here, the dynamic range (DLhl) between the target bright luminance value and the target average luminance value, which is used in the equation 2, is calculated by the following equation 4:

$$DLhl = DL \cdot (Yhl - Yave)/(Yhl - Ysd) \quad \text{equation 4}$$

DL: Dynamic range between target bright luminance value and target dark luminance value
Yhl: Bright luminance value
Yave: Average luminance value
Ysd: Dark luminance value The dynamic range (DLsd) between the target average luminance value and the target dark luminance value, which is used in the equation 3, is calculated by the following equation 5:

$$DLsd = DL \cdot (Yave - Ysd)/(Yhl - Ysd) \quad \text{equation 5}$$

The equations 4 and 5 will be supplementarily described with reference to FIG. 7. The dynamic range (DLhl) between the target bright luminance value and the target average luminance value (equation 4) is a value (a luminance range) obtained by applying the ratio of the luminance difference between Yhl and Yave to the luminance difference between Yhl and Ysd to the dynamic range (DL) between the target bright luminance value and the target dark luminance value, and the dynamic range (DLsd) between the target average luminance value and the target dark luminance value (equation 5) is a value (a luminance range) obtained by applying the ratio of the luminance difference Yave and Ysd to the luminance difference between Yhl and Ysd to the dynamic range (DL) between the target bright luminance value and the target dark luminance value.

The target bright luminance value (Ytarget_hl) and the target dark luminance value (Ytarget_sd) that are obtained by the equations 2 to 5 and the target average luminance value (Ytarget) inputted from the input device 2 are fed to the corrected value calculating circuit 15.

As described in the foregoing, the target average luminance value (Ytarget) becomes a corrected value of the average luminance value (Yave) obtained from the face image portion. The target bright luminance value (Ytarget_hl) becomes a corrected value of the bright luminance value (Yhl) obtained from the face image portion, and the target dark luminance value (Ytarget_sd) becomes a corrected value of the dark luminance value (Ysd) obtained from the face image portion.

Figure 6:
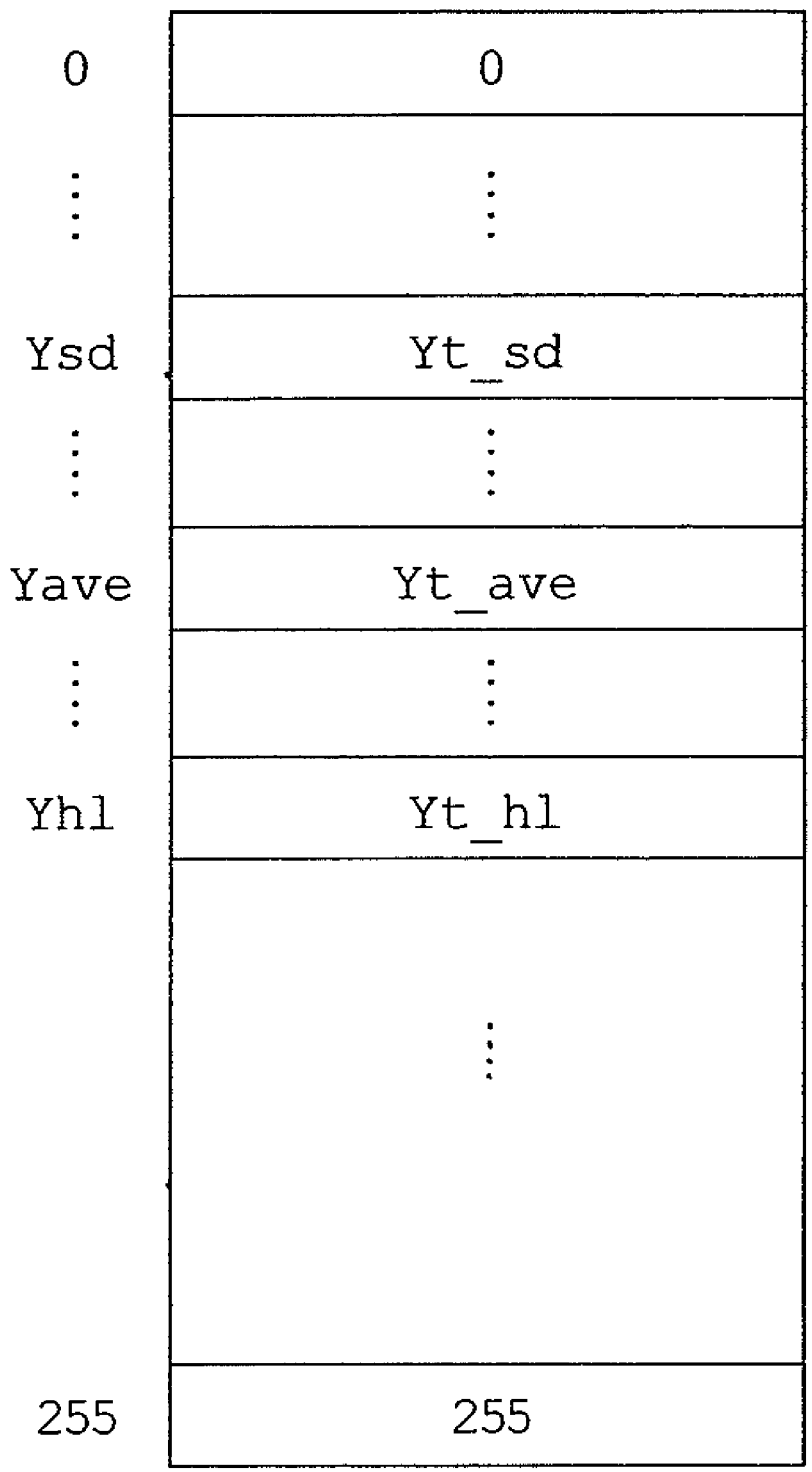
FIG. 6 shows a look-up table.
Figure 7:
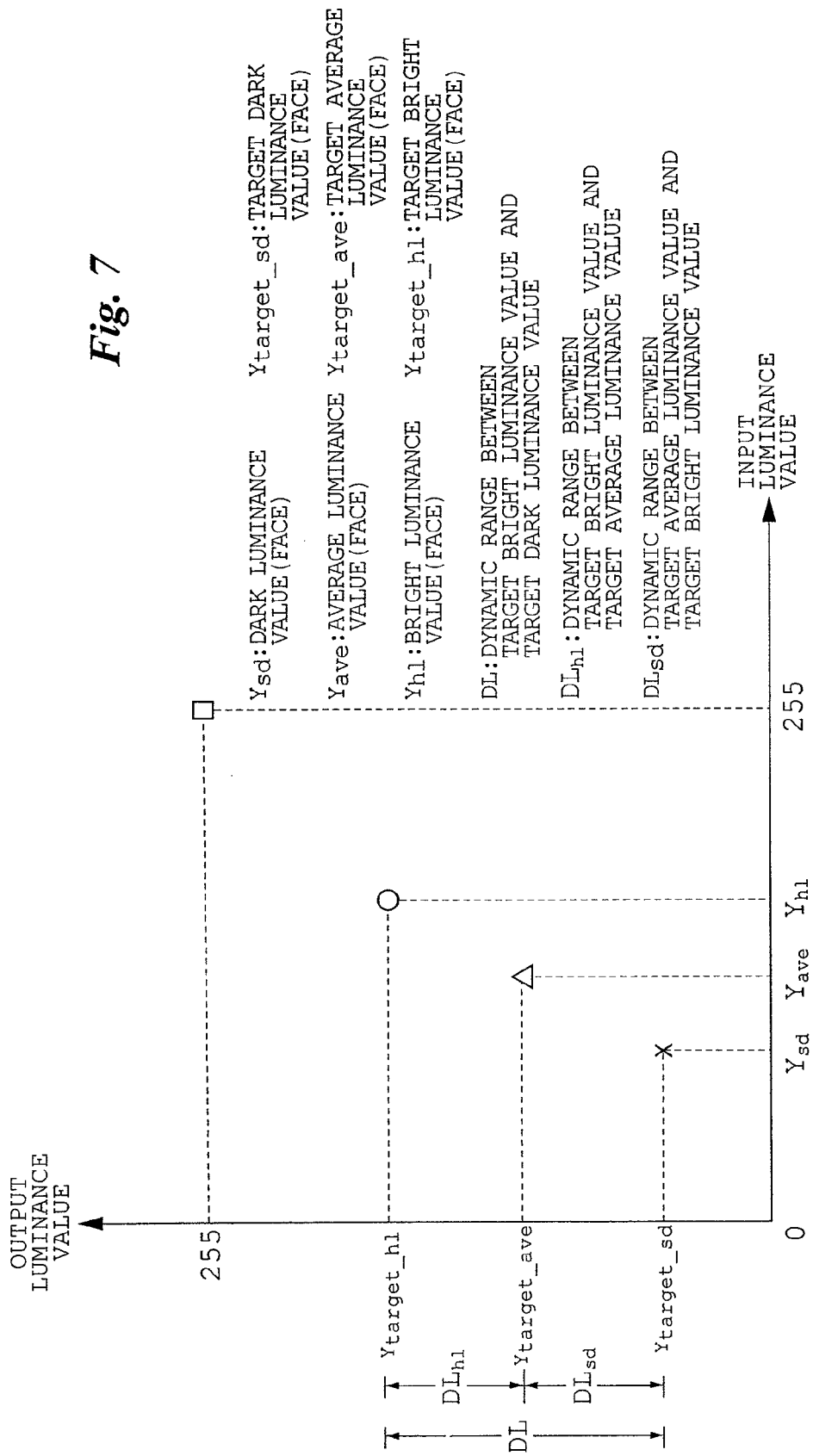
FIG. 7 shows the relationship between an input luminance value and an output luminance value (corrected value)

FIG. 6 shows the structure of the look-up table, and FIG. 7 shows a correspondence between the average luminance value (Yave) and the target average luminance value (Ytarget_ave), a correspondence between the bright luminance value (Yhl) and the target bright luminance value (Ytarget_hl), and a correspondence between the dark luminance value (Ysd) and the target dark luminance value (Ytarget_sd) using the input luminance value to enter the horizontal axis and using the output luminance value (corrected luminance value) to enter the vertical axis. In the present embodiment, the lowest input luminance value "0" and the highest input luminance value "255" shall not be corrected (input luminance value=output luminance value).

Assuming that the luminance value is represented by eight bits, the five output luminance values (corrected values) (0, Ytarget_sd, Ytarget_ave, Ytarget_hl, and 255) respectively corresponding to the five input luminance values (0, Ysd, Yave, Yhl, and 255) out of the input luminance values at 256 levels from 0 to 255 are determined by the foregoing processing. Output luminance values (corrected values) respectively corresponding to the input luminance values other than the five input luminance values (0, Ysd, Yave, Yhl, and 255) are then calculated.

Figure 8:
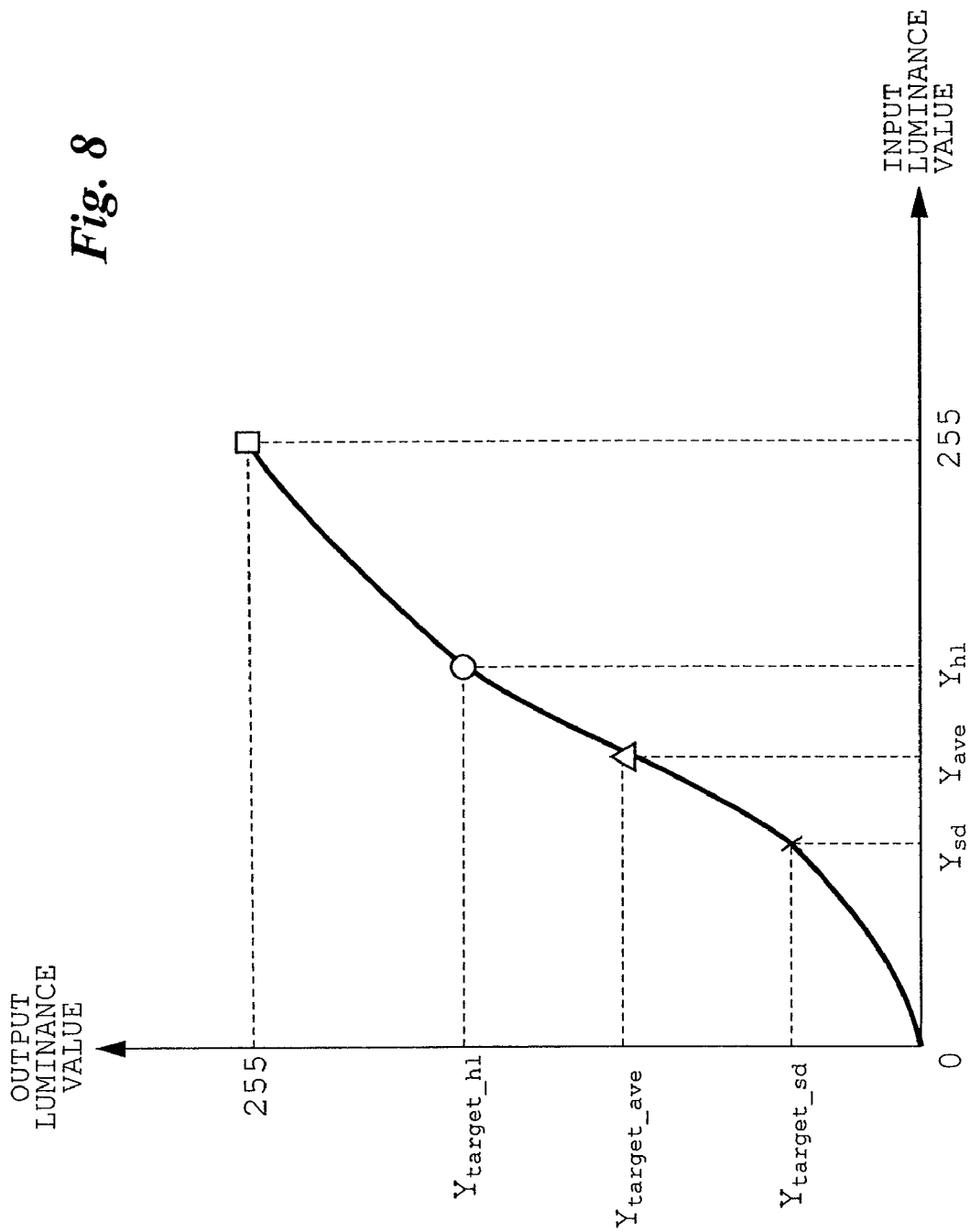
FIG. 8 shows the relationship between an input luminance value and an output luminance value (corrected value) using a luminance conversion curve.

The output luminance values (corrected values) respectively corresponding to the input luminance values other than the above-mentioned five input luminance values are calculated by interpolation processing. It is possible to use as the interpolation processing a spline interpolation method, a nearest neighbor method, a by-linear method, a by-cubic method, etc. FIG. 8 shows an example (a luminance conversion curve, a gray-scale curve) in which the five points (the respective five correspondences between the input luminance values and the output luminance values) shown in FIG. 7 by a three-dimensional spline interpolation method. By the interpolation processing, the look-up table shown in FIG. 6 stores the output luminance values (corrected values) corresponding to all the input luminance values 0 to 255.

The output luminance values (corrected values) corresponding to all the input luminance values 0 to 255 (the look-up table) are outputted from the corrected value calculating circuit (look-up table creating circuit) 15, and are inputted to the image correcting circuit 16. The image correcting circuit 16 subjects the image data read out of the storage device 4 to luminance correction using the look-up table. The luminance-corrected image data is outputted from the image correcting circuit 16 (the image correcting apparatus 1).

In the image correcting apparatus 1 according to the present embodiment, the five input luminance values, including the bright luminance value, the dark luminance value, and the average luminance value relating to the face image portion, and the output luminance values respectively corresponding to the five input luminance values are thus calculated, to create the look-up table (the luminance conversion curve, the gray-scale curve) by the interpolation processing on the basis of the respective five correspondences between the input luminance values and the output luminance values. The created look-up table is used, to subject the input image data to luminance correction. With respect to the face image portion included in the input image, the bright luminance value, the dark luminance value, and the average luminance value are accurately corrected, respectively, to the target luminance values (the target bright luminance value, the target dark luminance value, and the target average luminance value). By making the luminance conversion curve obtained by the interpolation processing smooth (using the three-dimensional spline interpolation method, for example), pixels having the luminance values other than the bright luminance value, the dark luminance value, and the average luminance value relating to the face image portion can be also respectively corrected to luminance values meeting a target (a user's taste), thereby making it possible to obtain an image after correction having hue, saturation, lightness that meet the user's taste.

Furthermore, the look-up table (luminance conversion curve) for defining luminance correction in the present embodiment is created such that not only the high contrast (low contrast) of the face image portion but also the high contrast (low contrast) of the entire image is not extremely changed (the luminance correction curve having a smooth curve can be obtained by the interpolation processing). Therefore, the high contrast (low contrast) of the entire image including the face image portion can be prevented from being extremely changed from the high contrast (low contrast) of the input image.

As can be seen from the foregoing equations 2 to 5, the target bright luminance value (Ytarget_hl) and the target dark luminance value (Ytarget_sd) are set depending on the inputted dynamic range (DL) between the target bright luminance value and the target dark luminance value. A large value may be inputted as the inputted dynamic range (DL) between the target bright luminance value and the target dark luminance value when the face image portion is corrected to high contrast (hard gradation), while a small value may be inputted as the inputted dynamic range (DL) between the target bright luminance value and the target dark luminance value when the face image portion is corrected to low contrast (soft gradation).

Figure 9:
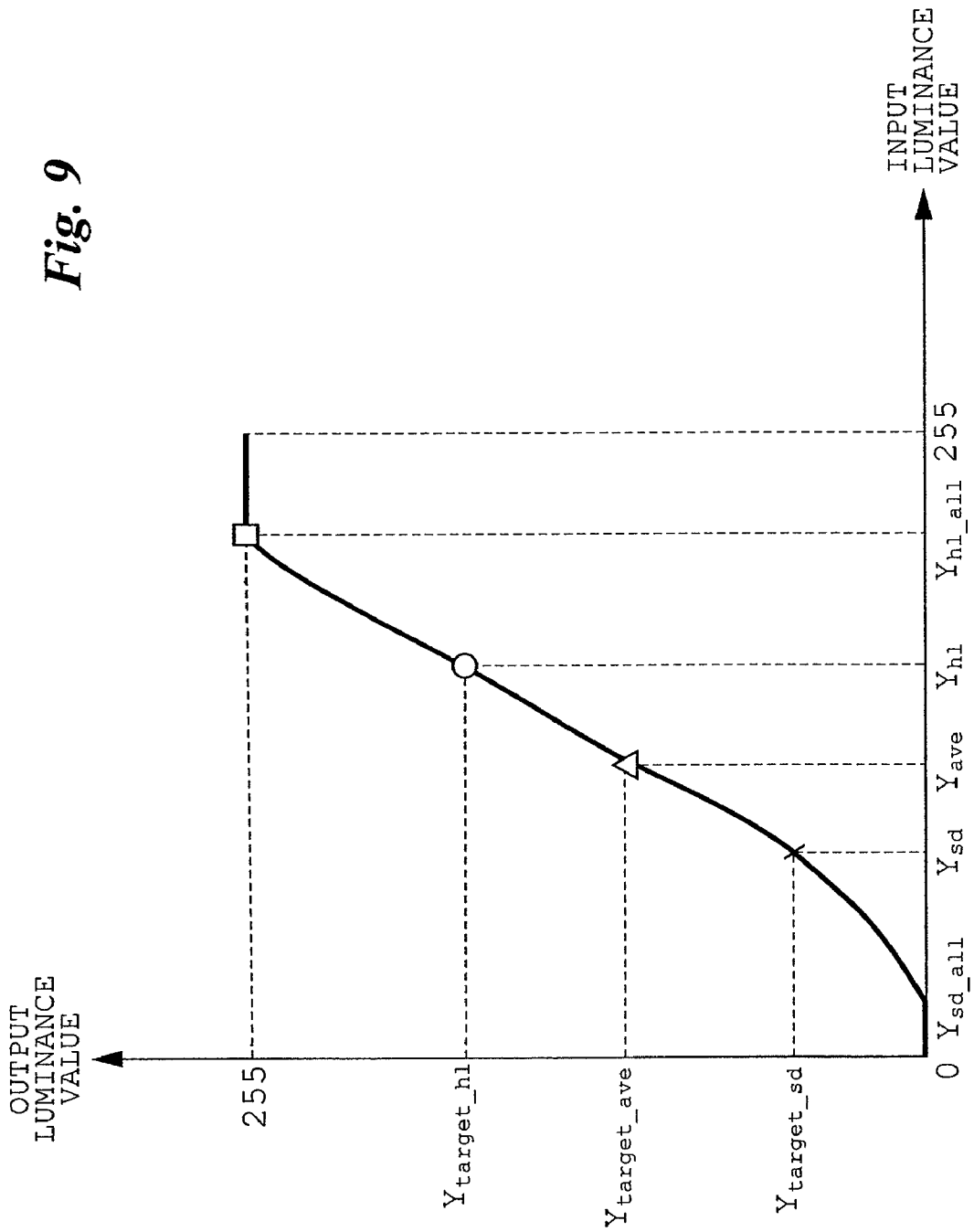
FIG. 9 shows another example of a luminance conversion curve representing the relationship between an input luminance value and an output luminance value (corrected value)

Although in the above-mentioned embodiment, (input luminance value, output luminance value)=(0, 0), (dark luminance value (Ysd), target dark luminance value (Ytarget_sd)), (average luminance value (Yave), target average luminance value (Ytarget)), (bright luminance value (Yhl), target bright luminance value (Ytarget_hl)) and (255, 255) are used as five points used for the interpolation processing (see FIGS. 7 and 8), (input luminance value, output luminance value)=(0, 0) may be replaced with (input luminance value, output luminance value)=(dark luminance value relating to the entire image (Ysd_all), 0), and (input luminance value, output luminance value)=(255, 255) may be replaced with (input luminance value, output luminance value)=(bright luminance value relating to the entire image (Yhl_all), 255). For example, a histogram based on the luminance values in the entire image is calculated. In the histogram, a luminance value that accounts for 0.3% of the total area from the largest luminance value is taken as a dark luminance value relating to the entire image (Ysd_all), and a luminance value that accounts for 1% of the total area from the smallest luminance value is taken as a bright luminance value relating to the entire image (Yhl_all). FIG. 9 shows a luminance conversion curve obtained by replacing (0, 0) and (255, 255) with (dark luminance value relating to the entire image (Ysd_all), 0) and (bright luminance value relating to the entire image (Yhl_all), 255).

Respective histograms for RGB values may be calculated with respect to the input image, to find, with respect to each of the three histograms, a value that accounts for 0.3% of the total area from the largest value, and to take a luminance value relating to the pixel taking the largest value as the bright luminance value relating to the entire image (Yhl_all).

Although in the above-mentioned embodiment, the dynamic range (DLhl) between the target bright luminance value and the target average luminance value and the dynamic range (DLsd) between the target average luminance value and the target dark luminance value are calculated using the dynamic range (DL) between the target bright luminance value and the target dark luminance value that are inputted from the input device 2 in the equations 4 and 5, the dynamic range (DLhl) between the target bright luminance value and the target average luminance value may be inputted from the input device 2 in place of input of the dynamic range (DL) between the target bright luminance value and the target dark luminance value, to calculate the dynamic range (DLsd) between the target average luminance value and the target dark luminance value using the inputted dynamic range (DLhl) between the target bright luminance value and the target average luminance value. In this case, the dynamic range (DLsd) between the target average luminance value and the target dark luminance value is calculated by the following equation 6:

$$DLsd = DLhl \cdot (Yhl - Yave)/(Yave - Ysd) \quad \text{equation 6}$$

DLsd: Dynamic range between target average luminance value and target dark luminance value DLhl: Dynamic range between target bright luminance value and target average luminance value Yhl: Bright luminance value Yave: Average luminance value Ysd: Dark luminance value Of course, the dynamic range (DLhl) between the target bright luminance value and the target average luminance value may be calculated using the inputted dynamic range (DLsd) between the target average luminance value and the target dark luminance value in such a manner that the dynamic range (DLsd) between the target average luminance value and the target dark luminance value is inputted from the input device 2.

In the above-mentioned embodiment, when the dynamic range (DL) between the target bright luminance value and the target dark luminance value that is inputted from the input device 2 by the operator of the digital printing system is an extremely large value (range), the slope of the luminance conversion curve corresponding to the luminance value relating to the face image portion is extremely large, so that a hue difference in the face image portion after correction may, in some case, be large (a color becomes worse). Preferably, restrictions may be put on the dynamic range (DL) between the target bright luminance value and the target dark luminance value that is inputted from the input device 2 by the following equation 7:

$$\underline{DL}=DL(R\text{target}-B\text{target})/(R\text{ave}-B\text{ave}) \quad \text{equation 7}$$

Here, Rtarget, Btarget, Rave, and Bave respectively indicate a target R value (set value) relating to the face, a target B value (set value) relating to the face, an average of R values of the pixels composing the face image portion, an average of B values of the pixels composing the face image portion. DL indicates the maximum range of a settable dynamic range. The restricted dynamic range $\underline{DL}$ between the target bright luminance value and the target dark luminance value (hereinafter referred to as restricted dynamic range) is used for calculating, when (Rave−Bave)>(Rtarget−Btarget), and the inputted dynamic range (DL) between the target bright luminance value and the target dark luminance value is more than the restricted dynamic range $\underline{DL}$, the bright luminance value (Yhl) and the dark luminance value (Ysd) in place of the inputted dynamic range (DL) between the target bright luminance value and the target dark luminance value. When (Rave−Bave)≦≦(Rtarget−Btarget), and the inputted dynamic range (DL) between the target bright luminance value and the target dark luminance value is not more than the restricted dynamic range $\underline{DL}$, the inputted dynamic range (DL) between the target bright luminance value and the target dark luminance value is used as it is for calculating the bright luminance value (Yhl) and the dark luminance value (Ysd).

It may be judged by calculation whether or not (Rave−Bave)>(Rtarget−Btarget) with respect to the image data after correction, to use, when (Rave−Bave)>(Rtarget−Btarget) and the inputted dynamic range (DL) between the target bright luminance value and the target dark luminance value is more than the restricted dynamic range $\underline{DL}$, the restricted dynamic range $\underline{DL}$ in place of the inputted dynamic range (DL) between the target bright luminance value and the target dark luminance value to calculate the target bright luminance value (Ytarget_hl) and the target dark luminance value (Ytarget_sd) again to make image correction (creation of the look-up table) again.

Although in the above-mentioned example, restrictions are put on the dynamic range DL between the target bright luminance value and the target dark luminance value that is inputted from the input device 2 by paying attention to the hue difference in the face image portion after correction (equation 7), it goes without saying that restrictions may be put on the dynamic range DL by paying attention to a saturation difference in the face image portion after correction or a brightness representative of the face image portion after correction in place of the hue difference.

A part or the whole of processing of a hardware circuit constituting the image correcting apparatus 1 may be realized by a program.

Second Embodiment

Figure 10:
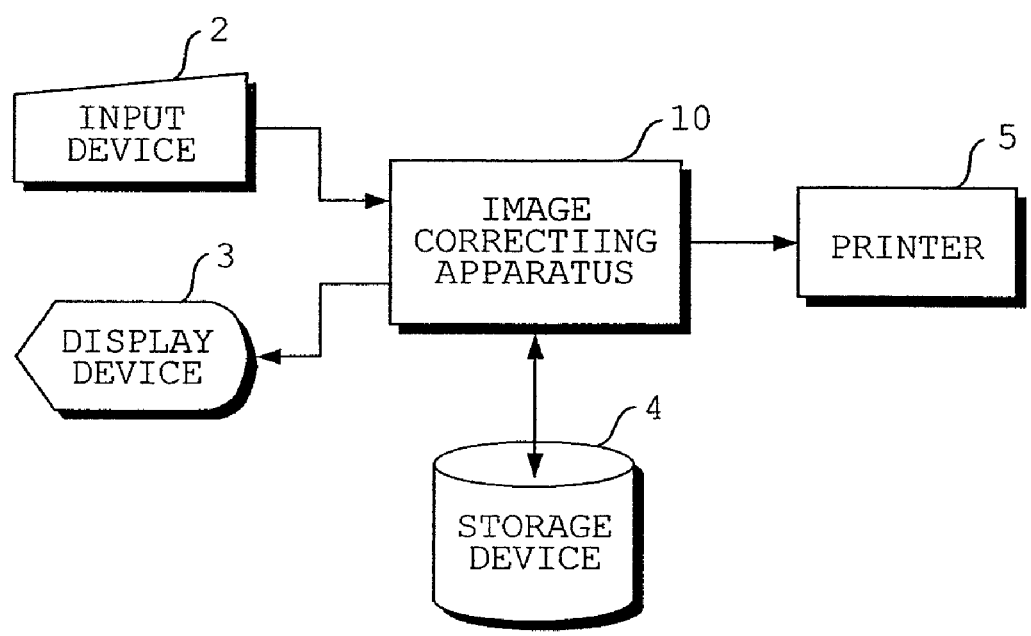
FIG. 10 is a block diagram showing the electrical configuration of a digital printing system according to a second embodiment.
Figure 11:
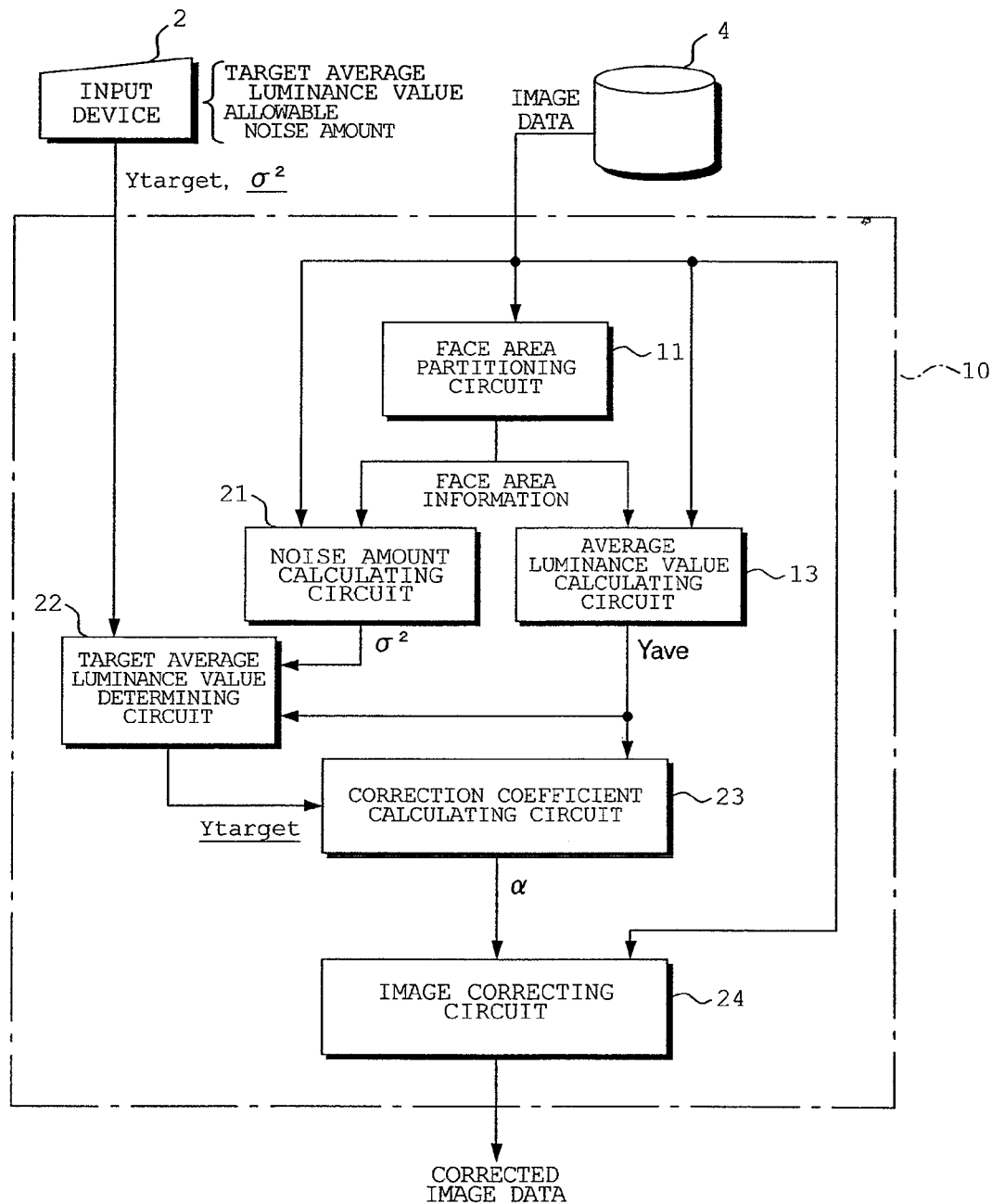
FIG. 11 is a block diagram showing the electrical configuration of an image correcting apparatus in the second embodiment.

FIG. 10 is a block diagram showing the configuration of a digital printing system according to a second embodiment. The digital printing system comprises an image correcting apparatus 10, and peripheral equipment (an input device 2, a display device 3, a storage device 4, and a printer 5) connected to the image correcting apparatus 10. FIG. 11 is a block diagram showing the detailed electrical configuration of the image correcting apparatus 10 that is a core apparatus in the digital printing system, together with the flow of data. In FIG. 10, the same components as those shown in FIG. 1 are assigned the same reference numerals. In FIG. 11, the same components as those shown in FIG. 2 are assigned the same reference numerals.

The image correcting apparatus 10 is an apparatus for subjecting fed image data to luminance correction such that the brightness (luminance) of a portion representing the face of a character included in an image represented by the image data (hereinafter referred to as a face image portion) has brightness (luminance) conforming to a target luminance value to be set. As described later, the image correcting apparatus 10 according to the second embodiment has the function of newly determining, when a predicted noise amount that may be included in image data representing the face image portion after luminance correction exceeds a predetermined noise amount (when it is estimated to exceed the noise amount), a target luminance value such that the predicted noise amount that may be included in the image data representing the face image portion after luminance correction will not exceed the predetermined noise amount.

The input device 2 (a keyboard, a mouse, etc.) connected to the image correcting apparatus 10 is used for input of a target average luminance value, an allowable noise amount, etc. (the target average luminance value and the allowable noise amount will be described later). On a display screen of the display device 3, a screen for setting the target average luminance value inputted from the input device 2, images represented by image data before and after correction, and so forth are displayed. The storage device (a hard disk, a memory card, a CD-ROM, etc.) 4 stores image data. The image data read out of the storage device 4 is subjected to image correction processing in the image correcting apparatus 10. The printer 5 prints the image represented by the image data after correction on printing paper or the like.

The image correcting apparatus 10 comprises a face area partitioning circuit 11, a noise amount calculating circuit 21, an average luminance value calculating circuit 13, a target average luminance value determining circuit 22, a correction coefficient calculating circuit 23, and an image correcting circuit 24.

The image data read out of the storage device 4 connected to the image correcting apparatus 10 is subjected to luminance correction in the image correcting circuit 24. The luminance correction processing performed in the image correcting circuit 24 conforms to a correction function that defines a correspondence between an input luminance value and an output luminance value (corrected value). A coefficient of the correction function used for luminance correction in the image correcting circuit 24 is calculated in the correction coefficient calculating circuit 23.

First, description is made of processing of the face area partitioning circuit 11, the noise amount calculating circuit 21, and the average luminance value calculating circuit 13. Calculation processing of a noise amount included in the face image portion and calculation processing of the average luminance value relating to the face image portion are performed by the face area partitioning circuit 11, the noise amount calculating circuit 21, and the average luminance value calculating circuit 13.

An image represented by image data to be subjected to correction processing shall include an image representing the face of a character (a face image). The image data representing the image including the face image is read out of the storage device 4.

The image data read out of the storage device 4 (hereinafter referred to as input image data) is inputted to each of the face area partitioning circuit 11, the noise amount calculating circuit 21, and the average luminance value calculating circuit 13.

The face area partitioning circuit 11 is a circuit for partitioning off the face image portion included in the image represented by the inputted image data (hereinafter referred to as input image) from the other image portion (for detecting the face image portion or defining a boundary), as in the above-mentioned first embodiment.

The face area information outputted from the face area partitioning circuit 11 is inputted to each of the noise amount calculating circuit 21 and the average luminance value calculating circuit 13.

The noise amount calculating circuit 21 calculates a noise amount in the face image portion included in the input image. As described above, the input image data representing the input image including the face image portion is fed to the noise amount calculating circuit 21 from the storage device 4. The area position of the face image portion included in the input image is specified by the face area information outputted from the face area partitioning circuit 11.

Figure 12:
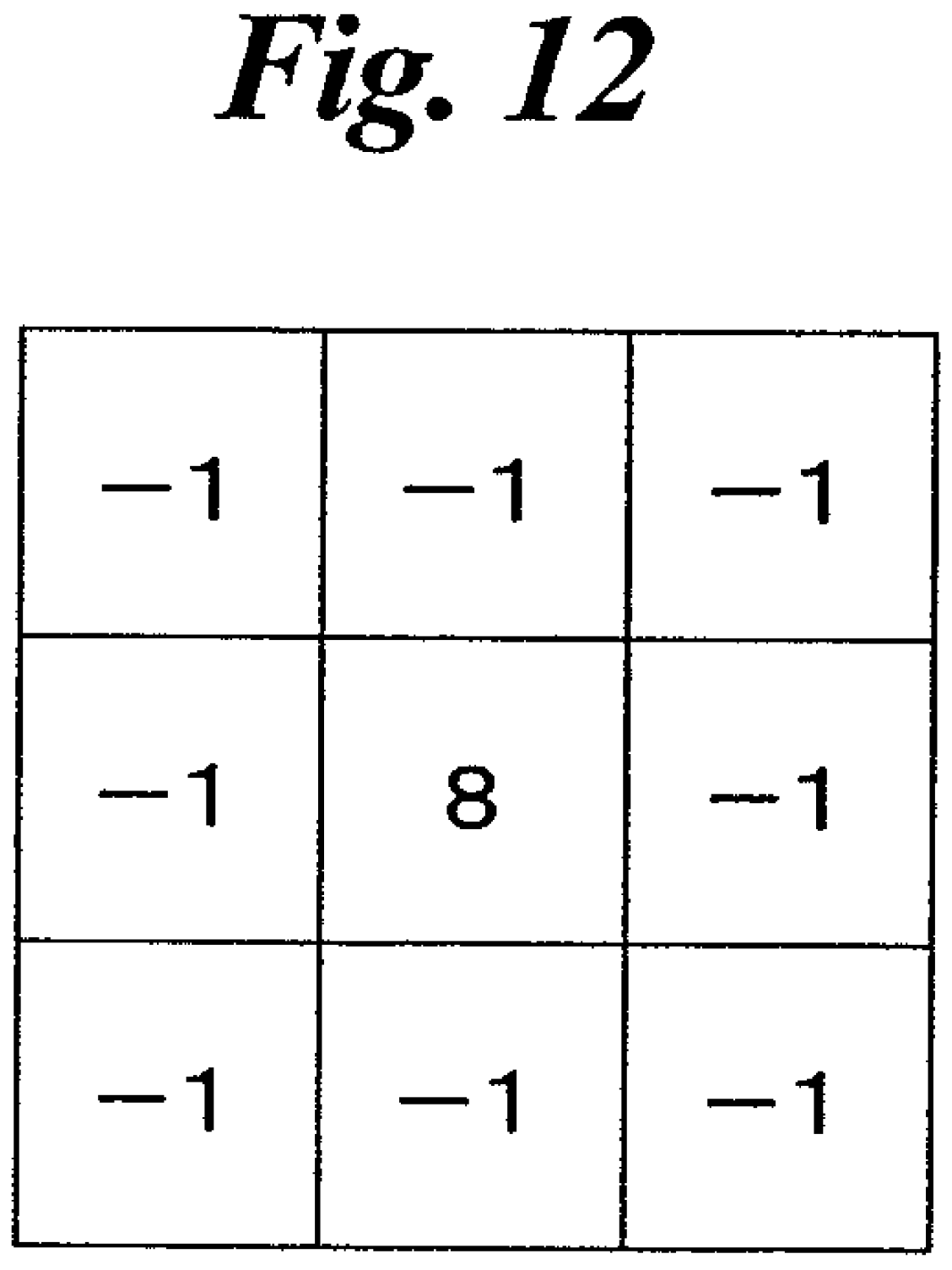

Generally, noise in the image appears as a high-frequency area component. The noise amount calculating circuit 21 filters each of pixels composing the face image portion using a high-pass filter, to find a high-frequency area component for each of the pixels composing the face image portion. For example, pixel filters in three rows by three columns shown in FIG. 12 are used for the high-pass filtering.

The high-frequency area component found for each of the pixels composing the face image portion is used, to calculate a dispersion value $\sigma^2$. The calculated dispersion value $\sigma^2$ is handled as the noise amount in the face image portion included in the input image.

The average luminance value calculating circuit 13 calculates an average of the luminance values for the pixels composing the face image portion included in the input image. The calculated average is an average luminance value (Yave). The average luminance value (Yave) is calculated by the foregoing equation 1.

When the image data fed to the average luminance value calculating circuit 13 is represented by an RGB value (antilogarithm) for each of the pixels, a luminance value Y for each of the pixels is calculated by the following equation 8 prior to calculating the average luminance value (Yave). This is also the same in the first embodiment.

$$Y=0.2126 \cdot R+0.7152 \cdot G+0.0722 \cdot B \qquad \text{equation 8}$$

Processing of the target average luminance value determining circuit 22 will be then described. The target average luminance determining circuit 22 determines a target average luminance value to be given to the correction coefficient calculating circuit 23 (hereinafter referred to as a determination target average luminance value ($\overline{Y\text{target}}$)). The determination target average luminance value ($\overline{Y\text{target}}$) determined in the target average luminance value determining circuit 22 becomes a value which differs depending on a noise amount $\sigma^2$ in the face image portion calculated by the noise amount calculating circuit 21, as described below.

As described above, the input device 2 is used by an operator of the digital printing system so that a target average luminance value (Ytarget) and an allowable noise amount $\overline{\sigma^2}$ (the maximum noise amount that is not handled if noise is included) are inputted. The inputted target average luminance value (Ytarget) and allowable noise amount $\overline{\sigma^2}$ are fed to the target average luminance value determining circuit 22. Further, the average luminance value (Yave) calculated in the average luminance value calculating circuit 13 is also inputted to the target average luminance value determining circuit 22.

The target average luminance value determining circuit 22 calculates the determination target average luminance value ($\overline{Y\text{target}}$) (a corrected value of the average luminance value (Yave)) by either one of the following equations 9 and 10:

$$\begin{aligned}\text{Determination target average luminance value}(\\ \overline{Y\text{target}})=\text{target average luminance value}(Y\text{target})\\ (\text{when } \sigma \leq \overline{\sigma}(Yave/Y\text{target}))\end{aligned} \qquad \text{equation 9}$$

$$\begin{aligned}\text{Determination target average luminance value}(\\ \overline{Y\text{target}})=\text{average luminance value}(Yave)\cdot\\ \sigma/\overline{\sigma}(\text{when } \sigma>\overline{\sigma}(Yave/Y\text{target}))\end{aligned} \qquad \text{equation 10}$$

Here, $\sigma$ and $\overline{\sigma}$ respectively indicate a square root of the noise amount $\sigma^2$ in the face image portion and a square root of the allowable noise amount $\overline{\sigma^2}$. Both the square root a of the noise amount $\sigma^2$ in the face image portion and the square root $\overline{\sigma}$ of the allowable noise amount $\overline{\sigma^2}$ are respectively used as values representing the magnitude of the noise amount.

In the equations 9 and 10, an equation including an inequality sign put in parentheses is used for judging whether or not a noise amount that may be included in the face image portion in a case where luminance correction is made exceeds a noise amount to be allowed. An equation including an inequality sign will be described below.

When an image is corrected to higher brightness (when the luminance value of image data is corrected to a higher value), noise recognized in the image after correction is increased. When the image is corrected to lower brightness, noise recognized in the image after correction is decreased. Considering that the magnitude of luminance correction and the variation in a noise amount are proportional to each other, letting $\Sigma^2$ be a predicted value of the noise amount in the face image portion (a predicted noise amount: a predicted dispersion value) in a case where it is assumed that luminance correction is made, a square root $\Sigma$ of the predicted noise amount $\Sigma^2$ is expressed by the following equation 11:

$$\Sigma=(Y\text{target}/Yave)\cdot\sigma \qquad \text{equation 11}$$

Σ: Square root of predicted noise amount
Ytarget: Target average luminance value
    Yave: Average luminance value
        σ: Square root of noise amount in face image portion Considering that the square root Σ of the predicted noise amount $\Sigma^2$ in the face image portion in a case where luminance correction is made is not more than the square root σ of the allowable noise amount $\sigma^2$, an inequality in the following equation 12 holds:

$$\Sigma \leq \sigma \qquad \text{equation 12}$$

When the equations 11 and 12 are integrated into one equation, a conditional expression put in parentheses in the equation 9 holds. A conditional expression put in parentheses in the equation 10 holds in accordance with the conditional expression put in parentheses in the equation 9.

Simply, it can be (of course, it may be) also judged by comparing the noise amount $\sigma^2$ (or its square root a) in the face image portion calculated by the noise amount calculating circuit 21 with the allowable noise amount $\sigma^2$ (or its square root σ) to be set whether or not the noise amount $\sigma^2$ (or its square root σ) in the face image portion exceeds the allowable noise amount $\sigma^2$ (or its square root σ). Alternatively, it can be (of course, it may be) also judged by comparing the predicted noise amount $\Sigma^2$ (or its square root Σ) in the face image portion with the allowable noise amount $\sigma^2$ (or its square root σ) to be set whether or not the predicted noise amount $\Sigma^2$ (or its square root Σ) in the face image portion exceeds the allowable noise amount $\sigma^2$ (or its square root σ). By using the conditional expressions that hold on the basis of the foregoing equations 11 and 12, the conditions (equation 12) under which the square root Σ of the predicted noise amount $\Sigma^2$ in the face image portion in a case where luminance correction is made is not more than the square root σ of the allowable noise amount $\sigma^2$ can be judged using the square root σ of the noise amount $\sigma^2$ in the face image portion, the square root σ of the allowable noise amount $\sigma^2$, the average luminance value (Yave), and the target average luminance value (Ytarget). A relatively accurate noise amount can be judged by paying attention to the noise amount in the face image portion after luminance correction.

When it is judged that the noise amount in the face image portion that is predicted after luminance correction is not more than the allowable noise amount (the inequality in the equation 9 holds), the target average luminance value (Ytarget) inputted from the input device 2 is considered to be a determination target average luminance value (Ytarget) (equation 9). The determination target average luminance value (Ytarget) (the same luminance value as the inputted target average luminance value (Ytarget)) is outputted from the target average luminance determining circuit 22.

It is judged that the noise amount in the face image portion that is predicted after luminance correction exceeds the allowable noise amount (the inequality in the equation 10 holds), the determination target average luminance value (Ytarget) having a value different from the target average luminance value (Ytarget) inputted from the input device 2 is calculated on the basis of the equation 10.

The equation 10 is a mathematical expression obtained by substituting the right side in the equation 12 into the left side in the equation 11. By the equation 10, such a determination target average luminance value (Ytarget) that the noise amount in the face image portion after correction is the same as the allowable noise amount (hereinafter referred to as a limited noise amount) is calculated. The determination target average luminance value (Ytarget) calculated in a case where it meets the conditional expression put in parentheses in the equation 10 takes a smaller value than the inputted target average luminance value (Ytarget). The degree to which the target average luminance value (Ytarget) to be determined is smaller than the inputted target average luminance value (Ytarget) varies depends on the allowable noise amount $\sigma^2$ previously set and the noise amount $\sigma^2$ included in the face image portion calculated by the noise amount calculating circuit 21. Generally in a case where the face image portion is corrected to higher brightness, such an allowable noise amount $\sigma^2$ that is not made as small as possible from the inputted target average luminance value (Ytarget) will be set.

The calculated luminance value is outputted as the determination target average luminance value (Ytarget) from the target average luminance value determining circuit 22.

The determination target average luminance value (Ytarget) outputted from the target average luminance value determining circuit 22 is fed to the correction coefficient calculating circuit 23. The correction coefficient calculating circuit 23 calculates a coefficient (correction coefficient α) in a relational expression between an input luminance value and an output luminance value (corrected luminance value) on the basis of the following equation 13:

$$\alpha = Y\text{target}/Y\text{ave} \qquad \text{equation 13}$$

α: Correction coefficient
Ytarget: Determination target average luminance value
Yave: Average luminance value The correction coefficient α calculated in the correction coefficient calculating circuit 23 is inputted to the image correcting circuit 24. The image correcting circuit 24 subjects the image data read out of the storage device 4 to luminance correction for each pixel on the basis of a correction function using the correction coefficient α. The correction function used for the luminance correction in the image correcting circuit 24 is expressed by the following equation 14:

$$\text{Output luminance value} = \alpha \cdot \text{input luminance value} \qquad \text{equation 14}$$

Figure 13:
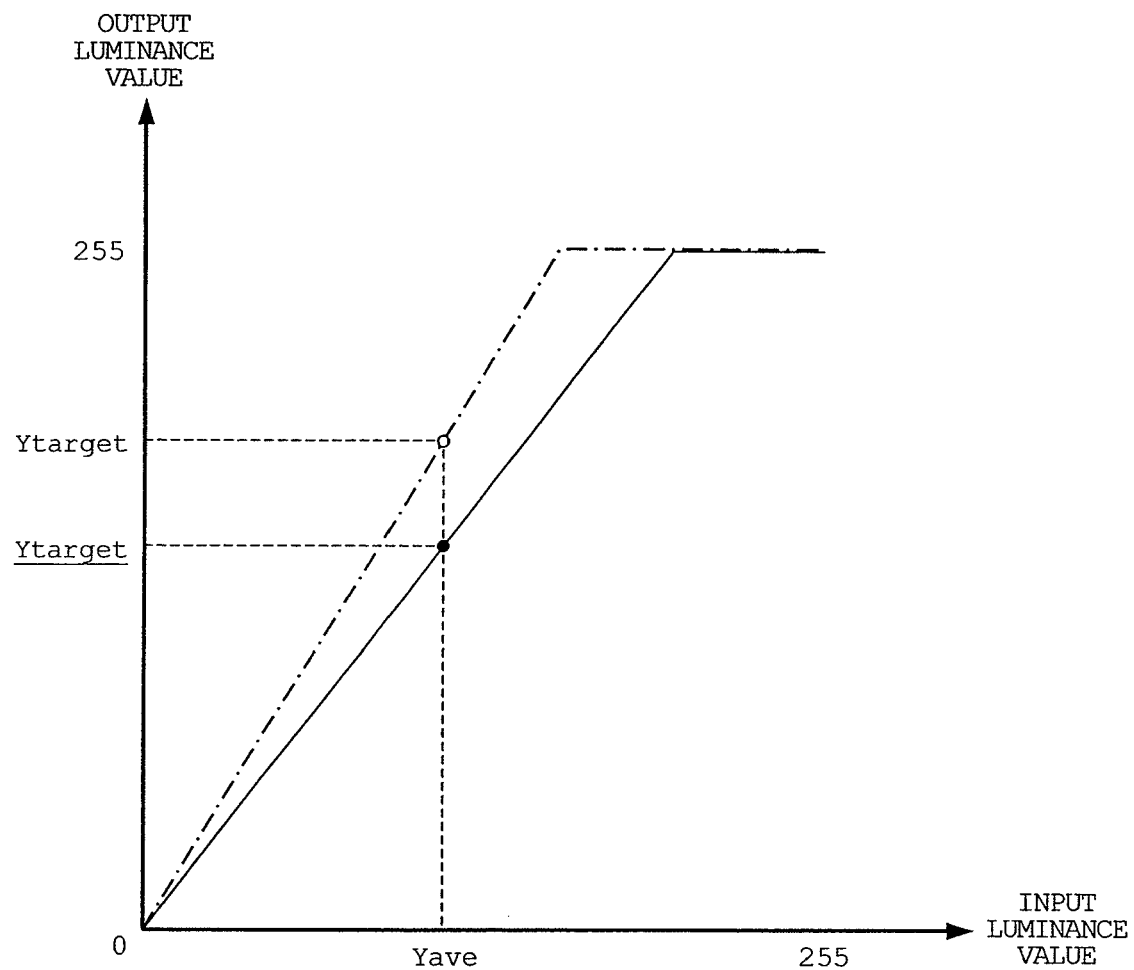
FIG. 13 shows a luminance conversion straight line.

FIG. 13 shows a graph of the correction function expressed by the equation 14 using the input luminance value to enter its horizontal axis and using the output luminance value (corrected value) to enter its vertical axis. In the graph (a luminance conversion straight line) shown in FIG. 13, a one-dot and dash line and a solid line respectively indicate an example of a correction function in a case where the predicted noise amount in the face image portion after luminance conversion is not more than the allowable noise amount (the case of the equation 9) and an example of a correction function in a case where the predicted noise amount in the face image portion after luminance conversion exceeds the allowable noise amount (the case of the equation 10). ○ and ● respectively indicate a corresponding point between the average luminance value (Yave) and the determination target average luminance value (the same value as the inputted target average luminance value (Ytarget)) in a case where the predicted noise amount in the face image portion after luminance conversion is not more than the allowable noise amount and a corresponding point between the average luminance value (Yave) and the determination target average luminance value (Ytarget) in a case where the predicted noise amount in the face image portion after luminance conversion exceeds the allowable noise amount. In the graph shown in FIG. 13, the luminance value (the input luminance value and the output luminance value) is represented at 256 levels from 0 to 255 levels by 8-bit data.

In the image correcting apparatus 10, when the noise amount in the face image portion predicted in a case where the luminance of the image including the face image portion is corrected on the basis of the inputted target average luminance value exceeds the allowable noise amount (equation 10), such a new target average luminance value (determination target average luminance value) that the noise amount in the face image portion after correction takes the same value as the allowable noise amount. The input image data is corrected by a correction function conforming to the calculated determination target average luminance value. A face image portion after correction in which noise is inconspicuous can be reliably obtained. Of course, when there is little noise in the image data representing the face image portion (the case of the equation 9), luminance correction meeting a user's request (whether the face image portion after correction is made bright or dark). It is possible to make luminance correction considering both a user's request for a noise amount and a user's request for luminance correction.

Although in the above-mentioned embodiment, a numerical value (luminance value) is inputted as the target average luminance value (Yave), inputs "somewhat bright" and "somewhat dark" may be, of course, provided from the input device 2. In this case, a relatively large numerical value is set as the target average luminance value (Yave) in correspondence with the input "somewhat bright", while a relatively small numerical value is set as the target average luminance value (Yave) in correspondence with the input "somewhat dark". The target average luminance value (Yave) to be set is previously stored in a memory in the target average luminance value determining circuit 22. Further, "somewhat large", "somewhat small", etc. may be also similarly set with respect to the above-mentioned allowable noise amount a $\sigma^2$. The same is true for a modified example, described later.

The correction coefficient α given to the image correcting circuit 24 is calculated using the image data (original image data) read out of the storage device 4 in the above-mentioned embodiment. The correction coefficient α may be calculated on the basis of reduced image data obtained by reducing the original image data in place of the original image data. In this case, a reducing circuit for reducing the original image data is provided in the image correcting apparatus 10. The face area partitioning circuit 11, the noise amount calculating circuit 21, the average luminance value calculating circuit 13, and the correction coefficient calculating circuit 23 respectively perform processing on the basis of the reduced image data. The image correcting circuit 24 subjects the original image data to luminance correction in accordance with the correction function defined by the correction coefficient α obtained using the reduced image data. The same is true for calculation of a corrected value (a look-up table) found in the modified example, described below.

MODIFIED EXAMPLE

Figure 14:
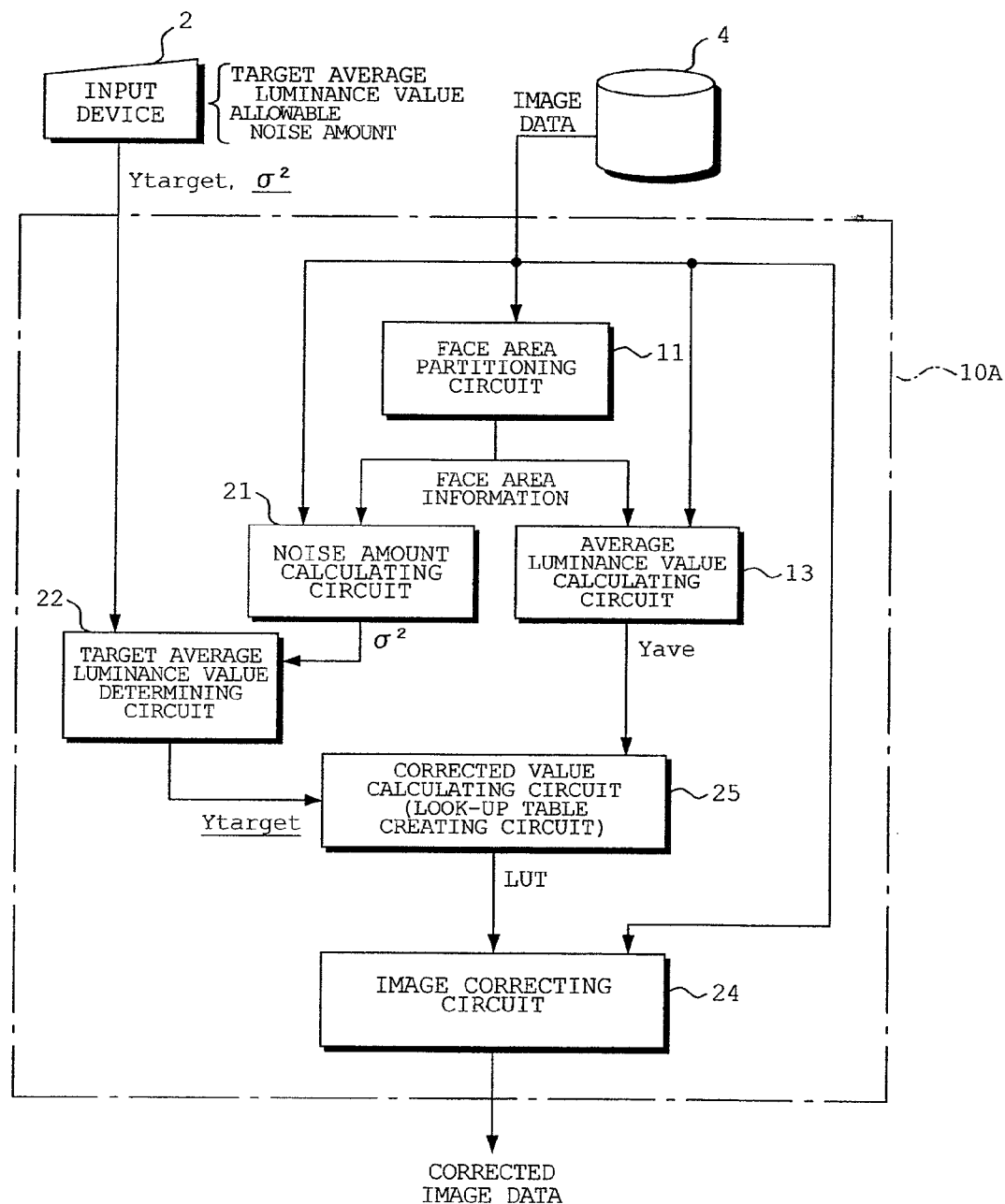
FIG. 14 is a block diagram showing the electrical configuration of an image correcting apparatus in a modified example of the second embodiment.

FIG. 14 illustrates the electrical configuration of an image correcting apparatus 10A in the modified example of the second embodiment. The image correcting apparatus 10A differs from the image correcting apparatus 10 shown in FIG. 11 in that a corrected value calculating circuit (a look-up table creating circuit) 25 is provided in place of the correction coefficient calculating circuit 23.

In the above-mentioned second embodiment, the input image data is subjected to luminance correction on the basis of the correction function (equation 14) (the luminance conversion straight line) using the correction coefficient α calculated in the correction coefficient calculating circuit 23 (see FIG. 13). In the modified example, respective correspondences (a luminance conversion curve) between all input luminance values and output luminance values corresponding thereto are obtained by interpolation processing in place of the luminance correction based on the correction function (equation 14) (the luminance conversion straight line) using the correction coefficient α.

The corrected value calculating circuit (look-up table creating circuit) 25 is a circuit utilizing respective correspondences between a plurality of (e.g., three) input luminance values and output luminance values that are previously obtained to calculate output luminance values corresponding to other input luminance values by interpolation processing (creating a look-up table (LUT)). As described above, in a target average luminance determining circuit 22, a correspondence between an average luminance value (Yave) that is one of the input luminance values and a determination target average luminance value (Ytarget) that is the output luminance value corresponding to the average luminance value (Yave) is obtained. In this modified example, a correspondence using the lowest luminance value as it is as a lowest luminance value and using the highest luminance value as it is as a highest luminance value is used as the other correspondence between the input luminance value and output luminance value, which is previously obtained. The lowest luminance value and the highest luminance value may be the lowest and highest luminance values (e.g., 0 and 255 in the case of 256 levels from 0 to 255) that can be taken as luminance values. Alternatively, the lowest and highest luminance values out of the luminance values for pixels in the input image may be the lowest and highest luminance values that can be taken as luminance values.

Figure 15:
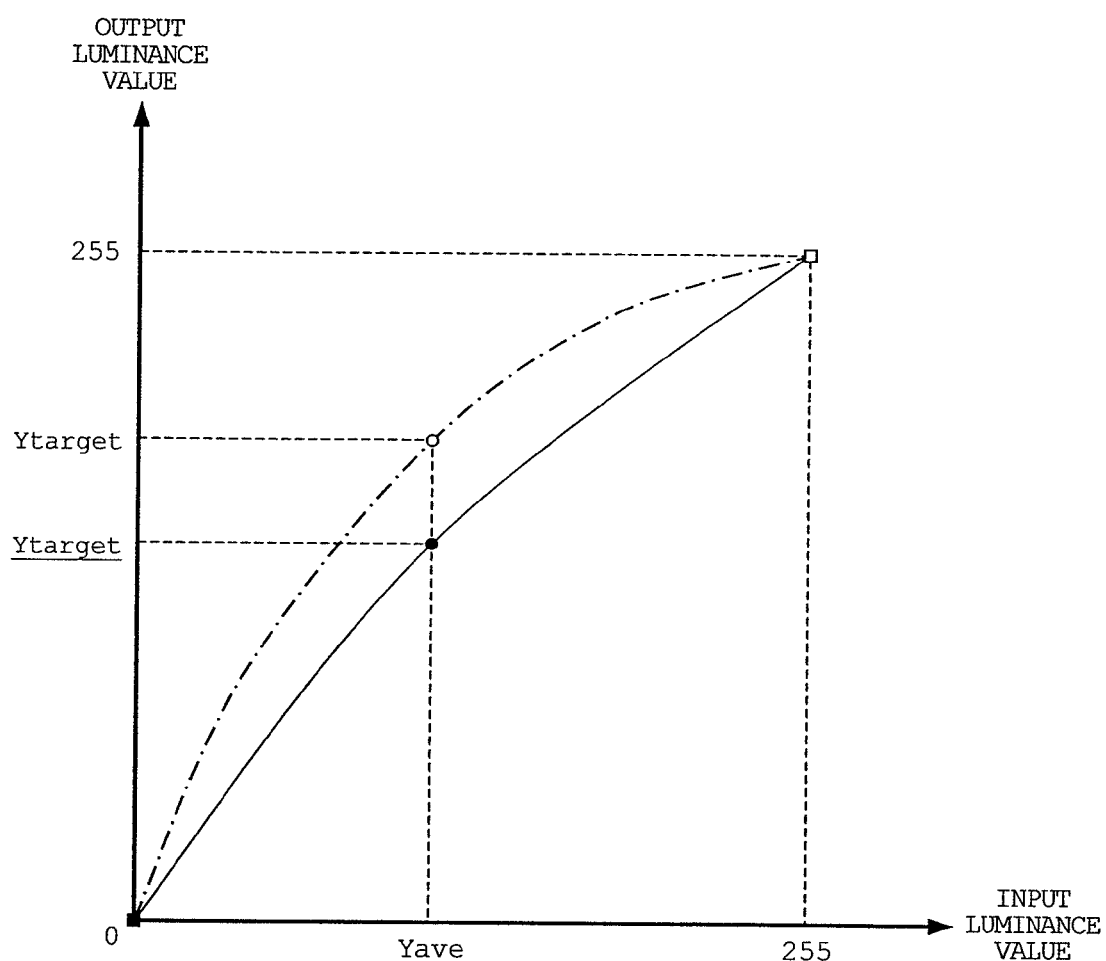
FIG. 15 shows a luminance conversion curve.

In the corrected value calculating circuit (look-up table creating circuit) 25, the output luminance values (corrected value) corresponding to the input luminance values other than the above-mentioned three input luminance values are calculated by interpolation processing. It is possible to utilize, as the interpolation processing, a spline interpolation method, a nearest neighbor method, a by-linear method, a by-cubic method, etc. FIG. 15 illustrates a luminance conversion curve (gray-scale curve) obtained by a two-dimensional spline interpolation method. A one-dot and dash line and a solid line respectively indicate a luminance conversion curve based on a corrected value (a look-up table) obtained when a predicted noise amount in a face image portion after luminance correction is not more than a allowable noise amount and a luminance conversion curve based on a corrected amount (a look-up table) obtained in a case where the predicted noise amount in the face image portion after luminance correction exceeds the allowable noise amount.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image correcting apparatus comprising:
    representative luminance value calculation circuit for calculating a representative luminance value in a particular image included in an image represented by fed image data;
    noise amount calculation circuit for calculating a noise amount included in particular image data representing the particular image;
    target luminance value determination circuit for determining a target luminance value depending on the noise amount calculated by the noise amount calculation circuit;
    circuit for producing data representing a luminance conversion straight line or a luminance conversion curve such that the represented luminance value calculated by the representative luminance value calculation circuit is corrected to the target luminance value determined by the target luminance value determination circuit; and luminance correction circuit for correcting the luminance of at least the particular image data representing the particular image on the basis of the produced data representing the luminance conversion straight line or the luminance conversion curve; and comprising desired target luminance value input circuit for accepting input of a desired target luminance value, and predicted noise amount calculation circuit for calculating a predicted noise amount that may be included in the particular image data after luminance correction on the basis of the representative luminance value calculated by the representative luminance value calculation circuit, the desired target luminance value inputted by the target luminance value input circuit and the noise amount calculated by the noise amount calculation circuit, the target luminance value determination circuit determining the target luminance value depending on the predicted noise amount calculated by the predicted noise amount calculation circuit.

2. The image correcting apparatus according to claim 1, wherein the target luminance value determination circuit determines, on the basis of an allowable noise amount for noise that may be included in the particular image data after luminance correction and the calculated noise amount or the calculated predicted noise amount, that are previously set or inputted, the target luminance value such that the noise amount or the predicted noise amount is not more than the allowable noise amount.

3. The image correcting apparatus according to claim 2, wherein the target luminance value determination circuit determines the desirable target luminance value inputted from the desirable target luminance value input circuit as the target luminance value when the calculated predicted noise amount is not more than the allowable noise amount, and calculates, when the calculated predicted noise amount exceeds the allowable noise amount, such a new target luminance value that the predicted noise amount is the same as the allowable noise amount on the basis of the representative luminance value, the allowable noise amount, and the noise amount, and determines the calculated new target luminance value as the target luminance value.

4. The image correcting apparatus according to claim 1, wherein said particular image is an image representing the face of a character.

5. The image correcting apparatus according to claim 1, wherein the representative luminance value is the average luminance value in the particular image.

6. An image correcting method comprising the steps of:
using at least one processor for performing:
calculating a representative luminance value in a particular image included in an image represented by fed image data;
calculating a noise amount included in particular image data representing the particular image;
determining a target luminance value depending on the calculated noise amount;
producing data representing a luminance conversion straight line or a luminance conversion curve such that the calculated representative luminance value is corrected to the determined target luminance value; and
correcting the luminance of at least the particular image data representing the particular image on the basis of the produced data representing the luminance conversion straight line or the luminance conversion curve; and
further comprising
accepting input of a desired target luminance value, and
calculating a predicted noise amount that may be included in the particular image data after luminance correction on the basis of the representative luminance value calculated by the representative luminance value calculation means, the desired target luminance value inputted by the target luminance value input means, and the noise amount calculated by the noise amount calculation means,
determining the target luminance value depending on the predicted noise amount calculated by the predicted noise amount calculation.

7. A non-transitory computer-readable storage medium for causing a computer to carry out the procedures for:
calculating a representative luminance value in a particular image included in an image represented by fed image data;
calculating a noise amount included in particular image data representing the particular image;
determining a target luminance value depending on the calculated noise amount;
producing data representing a luminance conversion straight line or a luminance conversion curve such that the calculated representative luminance value is corrected to the determined target luminance value; and
correcting the luminance of at least the particular image data representing the particular image on the basis of the produced data representing the luminance conversion straight line or the luminance conversion curve; and
accepting input of a desired target luminance value, and
calculating a predicted noise amount that may be included in the particular image data after luminance correction on the basis of the representative luminance value calculated by the representative luminance value calculation means, the desired target luminance value inputted by the target luminance value input means, and the noise amount calculated by the noise amount calculation means,
determining the target luminance value depending on the predicted noise amount calculated by the predicted noise amount calculation means.

* * * * *